(12) United States Patent
Zhou et al.

(10) Patent No.: US 11,425,526 B2
(45) Date of Patent: Aug. 23, 2022

(54) GROUP INDICATION OF SPATIALLY PROXIMATE UES

(71) Applicant: QUALCOMM Incorporated, San Diego, CA (US)

(72) Inventors: Yan Zhou, San Diego, CA (US); Junyi Li, Chester, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/021,873

(22) Filed: Sep. 15, 2020

(65) Prior Publication Data

US 2021/0084441 A1 Mar. 18, 2021

Related U.S. Application Data

(60) Provisional application No. 62/901,604, filed on Sep. 17, 2019.

(51) Int. Cl.
| | |
|---|---|
| *H04W 4/00* | (2018.01) |
| *H04W 4/02* | (2018.01) |
| *H04W 8/00* | (2009.01) |
| *H04W 48/16* | (2009.01) |
| *H04W 64/00* | (2009.01) |
| *H04W 72/04* | (2009.01) |
| *H04W 4/08* | (2009.01) |

(52) U.S. Cl.
CPC ............ *H04W 4/023* (2013.01); *H04W 4/08* (2013.01); *H04W 8/005* (2013.01); *H04W 48/16* (2013.01); *H04W 64/003* (2013.01); *H04W 72/042* (2013.01); *H04W 72/0413* (2013.01)

(58) Field of Classification Search
CPC ....... H04W 4/023; H04W 4/08; H04W 8/005; H04W 48/16; H04W 64/003; H04W 72/0413; H04W 72/042
See application file for complete search history.

(56) References Cited

U.S. PATENT DOCUMENTS

| | | | |
|---|---|---|---|
| 2017/0208479 A1* | 7/2017 | Takeda | H04W 72/0406 |
| 2018/0159603 A1 | 6/2018 | Kim et al. | |
| 2018/0183505 A1 | 6/2018 | Kim et al. | |

OTHER PUBLICATIONS

International Search Report and Written Opinion—PCT/US2020/051045—ISA/EPO—dated Nov. 24, 2020.

* cited by examiner

*Primary Examiner* — Erika A Washington
(74) *Attorney, Agent, or Firm* — Danai Nelisile Mhembere; Holland & Hart LLP

(57) ABSTRACT

Methods, systems, and devices for wireless communications are described. A first user equipment (UE) may transmit a group proximity message indicating that a group of UEs, including the first UE and a second UE, are located within a defined proximity of each other. The first UE may receive a beam configuration for the group of UEs based on the group proximity message. The first UE may then communicate with a base station based on the beam configuration. For example, the first UE may be configured for beam measurement and reporting for the group. The base station may then select a common beam for the UEs in the group based on the beam measurement and reporting performed by the first UE.

75 Claims, 15 Drawing Sheets

GROUP INDICATION OF SPATIALLY PROXIMATE UES

CROSS REFERENCE

The present application for patent claims the benefit of U.S. Provisional Patent Application No. 62/901,604 by ZHOU et al., entitled "GROUP INDICATION OF SPATIALLY PROXIMATE UES," filed Sep. 17, 2019, assigned to the assignee hereof, and expressly incorporated by reference herein.

BACKGROUND

The following relates generally to wireless communications, and more specifically to group indication of spatially proximate UEs.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

A base station may communicate with a UE using beamformed communications. Techniques for managing UE mobility and proximity while performing beamformed communications can be improved.

SUMMARY

The described techniques relate to improved methods, systems, devices, and apparatuses that support group indication of spatially proximate user equipments (UEs). Generally, the described techniques provide for managing UEs that are in close proximity. A base station may support beamformed communications with multiple UEs. In some cases, each beam of the base station may serve multiple UEs, such as if the UEs are located in close proximity. Each UE may not use a large amount of bandwidth for its payload, so the UEs may be frequency division multiplexed on the same beam. Grouping spatially close UEs may provide some benefits for a base station. For example, when the base station performs beams sweeps, the grouped UEs may be swept together as a group.

To assist a base station in identifying UE groups, a UE may transmit a group proximity message to the base station. The group proximity message may indicate that there is a group of UEs that are in proximity of each other. In some cases, the group proximity message may include an approximation of how close the UEs are, such as that the UEs are within a certain radius. The group proximity message may include information for UEs in the group, such as identifiers for the UEs, an identifier for the group, proximity metrics such as group radius, a leader UE identifier, UE positions, or any combination thereof. The group information may be dynamically updated, for example by transmitting another group proximity message. The base station may receive the group proximity message and communicate with the group of UEs based on the group proximity message. In some cases, by indicating the group of UEs, the base station may be able to reduce a beam measurement and report overhead. For example, the base station may configure just a subset of UEs in the group for beam measurement and reporting, and the base station may use the same beam for each UE in the group. In some cases, a reference signal for UE beam measurement may be signaled to a UE of the group (e.g., just one UE of the group), and each UE in the group may measure the reference signal. In some cases, the group proximity message may reduce a beam sweep signaling overhead for the base station. For example, the base station may update a beam sweep pattern for the group of UEs instead of individually signaling the change to each UE.

A method of wireless communications by a first UE is described. The method may include transmitting a group proximity message indicating that a group of UEs including the first UE and a second UE are located within a defined proximity of each other, receiving a beam configuration for the group of UEs based on the group proximity message, and communicating with a base station based on the beam configuration.

An apparatus for wireless communications by a first UE is described. The apparatus may include a processor, memory coupled with the processor, and instructions stored in the memory. The instructions may be executable by the processor to cause the apparatus to transmit a group proximity message indicating that a group of UEs including the first UE and a second UE are located within a defined proximity of each other, receive a beam configuration for the group of UEs based on the group proximity message, and communicate with a base station based on the beam configuration.

Another apparatus for wireless communications by a first UE is described. The apparatus may include means for transmitting a group proximity message indicating that a group of UEs including the first UE and a second UE are located within a defined proximity of each other, receiving a beam configuration for the group of UEs based on the group proximity message, and communicating with a base station based on the beam configuration.

A non-transitory computer-readable medium storing code for wireless communications by a first UE is described. The code may include instructions executable by a processor to transmit a group proximity message indicating that a group of UEs including the first UE and a second UE are located within a defined proximity of each other, receive a beam configuration for the group of UEs based on the group proximity message, and communicate with a base station based on the beam configuration.

In some examples of the method, apparatuses, and non-transitory computer-readable medium described herein, receiving the beam configuration may include operations, features, means, or instructions for receiving the beam configuration that indicates a beam measurement reporting configuration for the group of UEs.

In some examples of the method, apparatuses, and non-transitory computer-readable medium described herein, communicating with the base station may include operations, features, means, or instructions for transmitting, by the first UE, a beam measurement report to the base station for the group of UEs based on the beam measurement reporting configuration.

Some examples of the method, apparatuses, and non-transitory computer-readable medium described herein may further include operations, features, means, or instructions for monitoring for a data transmission or a control transmission from the base station via a beam selected for transmissions to the group of UEs based on the beam measurement report.

In some examples of the method, apparatuses, and non-transitory computer-readable medium described herein, receiving the beam configuration may include operations, features, means, or instructions for receiving the beam configuration that indicates a beam measurement reporting configuration for a first subset of the group of UEs, the first subset including the first UE.

In some examples of the method, apparatuses, and non-transitory computer-readable medium described herein, communicating with the base station may include operations, features, means, or instructions for transmitting, by the first UE, a beam measurement report to the base station for the first subset based on the beam measurement reporting configuration.

Some examples of the method, apparatuses, and non-transitory computer-readable medium described herein may further include operations, features, means, or instructions for monitoring for a data transmission or a control transmission from the base station via a beam selected for transmissions to the first subset based on the beam measurement report.

In some examples of the method, apparatuses, and non-transitory computer-readable medium described herein, the first UE and the second UE may be at respective edges of a formation of the group, and where a beam may be selected by the base station for each UE in the group based on relative positions of respective UEs in the group.

In some examples of the method, apparatuses, and non-transitory computer-readable medium described herein, receiving the beam configuration may include operations, features, means, or instructions for receiving a broadcast message or a multicast message for the group of UEs indicating a beam selected by the base station for each UE in the group of UEs, where the communicating with the base station may be based on the broadcast message or the multicast message.

In some examples of the method, apparatuses, and non-transitory computer-readable medium described herein, the broadcast message or the multicast message may include downlink control information (DCI) or a medium access control (MAC) control element (MAC-CE).

In some examples of the method, apparatuses, and non-transitory computer-readable medium described herein, the DCI may include a group common DCI.

In some examples of the method, apparatuses, and non-transitory computer-readable medium described herein, the group common DCI may be scrambled using a radio network temporary identifier (RNTI) associated with the group of UEs.

In some examples of the method, apparatuses, and non-transitory computer-readable medium described herein, transmitting the group proximity message may include operations, features, means, or instructions for transmitting a group identifier for the group of UEs.

In some examples of the method, apparatuses, and non-transitory computer-readable medium described herein, transmitting the group proximity message may include operations, features, means, or instructions for transmitting group information for the group of UEs.

In some examples of the method, apparatuses, and non-transitory computer-readable medium described herein, the group information includes one or more of a UE identifier for one or more UEs within the group of UEs, proximity metric data, group radius data, a leader identifier, UE position data, or any combination thereof.

In some examples of the method, apparatuses, and non-transitory computer-readable medium described herein, receiving the beam configuration may include operations, features, means, or instructions for receiving the beam configuration that indicates a beam sweep pattern for the group of UEs, where communicating with the base station may be in accordance with the beam sweep pattern.

A method of wireless communications by a base station is described. The method may include receiving a group proximity message indicating that a group of user equipments (UEs) including a first UE and a second UE are located within a defined proximity of each other, transmitting a beam configuration for the group of UEs based on the group proximity message, and communicating with the group of UEs based on the beam configuration.

An apparatus for wireless communications by a base station is described. The apparatus may include a processor, memory coupled with the processor, and instructions stored in the memory. The instructions may be executable by the processor to cause the apparatus to receive a group proximity message indicating that a group of user equipments (UEs) including a first UE and a second UE are located within a defined proximity of each other, transmit a beam configuration for the group of UEs based on the group proximity message, and communicate with the group of UEs based on the beam configuration.

Another apparatus for wireless communications by a base station is described. The apparatus may include means for receiving a group proximity message indicating that a group of user equipments (UEs) including a first UE and a second UE are located within a defined proximity of each other, transmitting a beam configuration for the group of UEs based on the group proximity message, and communicating with the group of UEs based on the beam configuration.

A non-transitory computer-readable medium storing code for wireless communications by a base station is described. The code may include instructions executable by a processor to receive a group proximity message indicating that a group of user equipments (UEs) including a first UE and a second UE are located within a defined proximity of each other, transmit a beam configuration for the group of UEs based on the group proximity message, and communicate with the group of UEs based on the beam configuration.

In some examples of the method, apparatuses, and non-transitory computer-readable medium described herein, transmitting the beam configuration may include operations, features, means, or instructions for transmitting the beam configuration that indicates a beam measurement reporting configuration for the group of UEs.

In some examples of the method, apparatuses, and non-transitory computer-readable medium described herein, communicating with the group of UEs may include operations, features, means, or instructions for receiving, from a first UE of the group of UEs, a beam measurement report for the group of UEs based on the beam measurement reporting configuration.

Some examples of the method, apparatuses, and non-transitory computer-readable medium described herein may further include operations, features, means, or instructions for transmitting a data transmission or a control transmission to one or more UEs of the group of UEs via a beam selected for transmissions to the group of UEs based on the beam measurement report.

In some examples of the method, apparatuses, and non-transitory computer-readable medium described herein, transmitting the beam configuration may include operations, features, means, or instructions for transmitting the beam configuration that indicates a first beam measurement reporting configuration for a first subset of the group of UEs and a second beam measurement reporting configuration for a second subset of the group of UEs.

Some examples of the method, apparatuses, and non-transitory computer-readable medium described herein may further include operations, features, means, or instructions for selecting a beam for each UE in the group based on relative positions of respective UEs in the group.

In some examples of the method, apparatuses, and non-transitory computer-readable medium described herein, communicating with the group of UEs may include operations, features, means, or instructions for receiving, from a first UE of the group of UEs, a first beam measurement report for the first subset based on the first beam measurement reporting configuration, and receiving, from a second UE of the group of UEs, a second beam measurement report for the second subset based on the second beam measurement reporting configuration.

Some examples of the method, apparatuses, and non-transitory computer-readable medium described herein may further include operations, features, means, or instructions for transmitting a first data transmission or a first control transmission from the base station to the first subset via a first beam selected for transmissions to the first subset based on the first beam measurement report, and transmitting a second data transmission or a second control transmission from the base station to the second subset via a second beam selected for transmissions to the second subset based on the second beam measurement report.

In some examples of the method, apparatuses, and non-transitory computer-readable medium described herein, receiving the group proximity message may include operations, features, means, or instructions for receiving the group proximity message that indicates movement sequence information for one or more UEs in the group of UEs.

In some examples of the method, apparatuses, and non-transitory computer-readable medium described herein, receiving the group proximity message may include operations, features, means, or instructions for receiving a group identifier for the group of UEs.

In some examples of the method, apparatuses, and non-transitory computer-readable medium described herein, receiving the group proximity message may include operations, features, means, or instructions for receiving a set of UE identifiers associated with the group identifier, where the set of UE identifiers may correspond to the first UE and the second UE.

In some examples of the method, apparatuses, and non-transitory computer-readable medium described herein, receiving the group proximity message may include operations, features, means, or instructions for receiving group information for the group of UEs.

In some examples of the method, apparatuses, and non-transitory computer-readable medium described herein, the group information includes one or more of a UE identifier for one or more UEs within the group of UEs, proximity metric data, group radius data, a leader identifier, UE position data, or any combination thereof.

In some examples of the method, apparatuses, and non-transitory computer-readable medium described herein, the group proximity message may indicate that the group of UEs including the first UE and the second UE are located within the defined proximity of each other based on UE position data for one or more UEs within the group of UEs.

In some examples of the method, apparatuses, and non-transitory computer-readable medium described herein, transmitting the beam configuration may include operations, features, means, or instructions for transmitting the beam configuration that indicates a beam sweep pattern for the group of UEs, where communicating with the group of UEs may be in accordance with the beam sweep pattern.

In some examples of the method, apparatuses, and non-transitory computer-readable medium described herein, transmitting the beam configuration may include operations, features, means, or instructions for transmitting a broadcast message or a multicast message for the group of UEs indicating a beam selected by the base station for each UE in the group of UEs, where the communicating with the group of UEs may be based on the broadcast message or the multicast message.

In some examples of the method, apparatuses, and non-transitory computer-readable medium described herein, the broadcast message or the multicast message may include DCI or a MAC-CE.

In some examples of the method, apparatuses, and non-transitory computer-readable medium described herein, the DCI may include a group common DCI.

In some examples of the method, apparatuses, and non-transitory computer-readable medium described herein, the group common DCI may be scrambled using a RNTI associated with the group of UEs.

DETAILED DESCRIPTION

Figure 1:
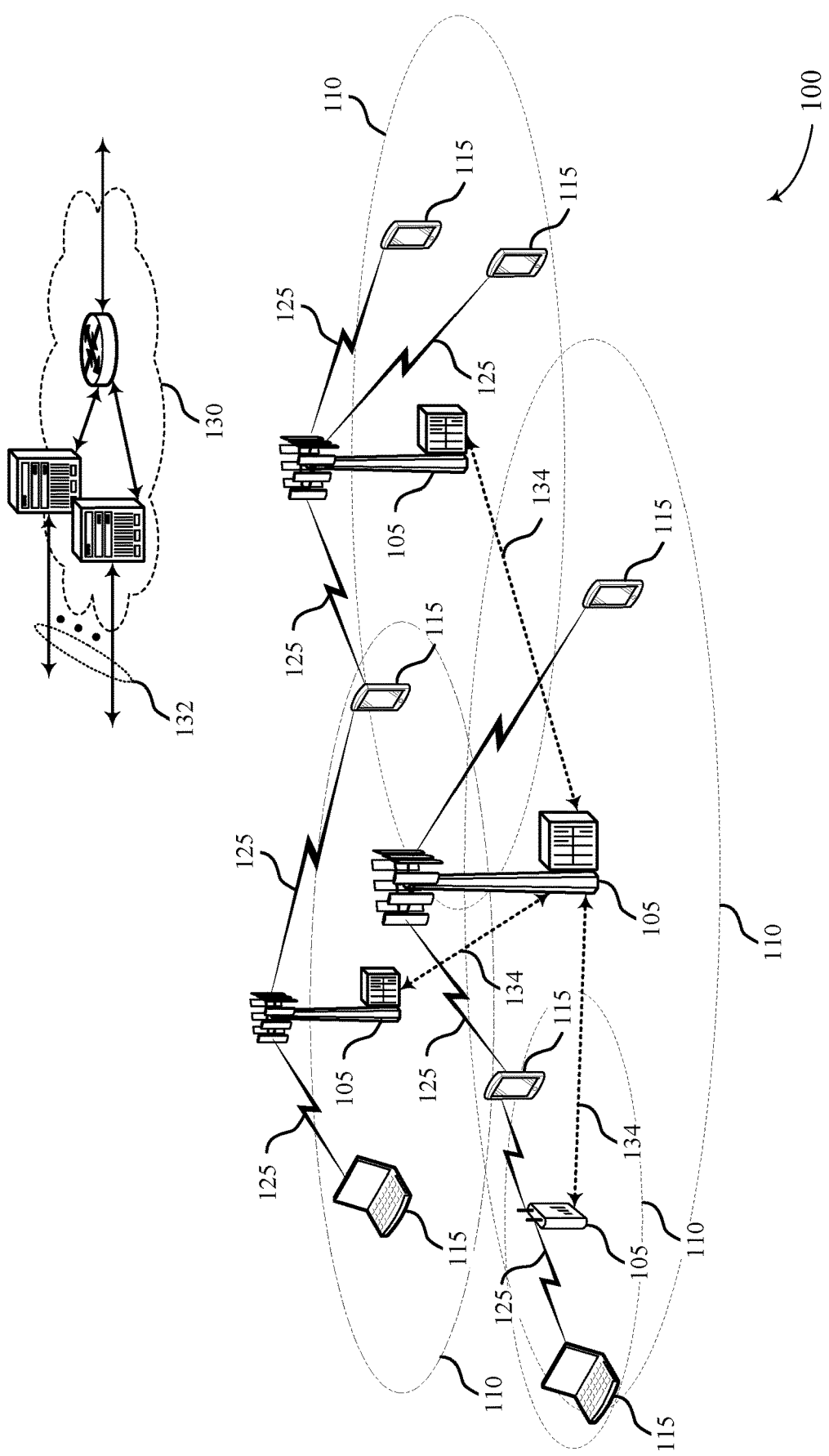
FIG. 1 illustrates an example of a system for wireless communications that supports group indication of spatially proximate UEs in accordance with aspects of the present disclosure.

A base station may support beamformed communications with multiple user equipments (UEs). In some cases, each beam of the base station may serve multiple UEs. For example, if multiple UEs are located in close proximity or an antenna array is split into multiple sub-arrays for multi-user (MU) MIMO (MU-MIMO), each beam may serve multiple UEs. In some cases, a UE may not use a large amount of bandwidth for its payload. In this example, UEs may be grouped and served by a common beam by frequency division multiplexing the grouped UEs, such that each UE of the group is assigned a different portion of bandwidth on the beam. Grouping spatially close UEs may provide some benefits for a base station. For example, when the base station performs beams sweeps, the grouped UEs may be swept together as a group. Therefore, there may be some advantages for a base station to identify groups of UEs 115. Techniques described herein support enhanced managing of UE proximity and grouping.

For example, a UE may transmit a group proximity message to a base station. The group proximity message may indicate that there is a group of UEs that are in proximity of each other. In an example, the group of UEs may be in a car, on a moving robot, or on different vehicles in platooning. In some cases, the indication may include an approximation of how close the UEs are, such as that the UEs are within a certain radius. The UE may detect that there are other UEs are in close proximity based on, for example, device-to-device (D2D) communications, detecting a same beacon signal, or being pre-configured as a group of related devices. The group proximity message may include information for UEs in the group. For example, the indication may include identifiers for the UEs, an identifier for the group, proximity metrics like group radius, a leader UE identifier, UE positions, or any combination thereof. The group information may be dynamically updated, for example by transmitting another group proximity message.

The base station may receive the group proximity message and communicate with the group of UEs 115 based on the group proximity message. In some cases, by indicating the group of UEs, the base station may be able to reduce a beam measurement and report overhead. For example, the base station may configure just a subset of UEs in the group for beam measurement and reporting, and the base station may then use the same beam for each UE in the group. In some cases, a reference signal for UE beam measurement may be signaled to a UE of the group (e.g., just one UE of the group), and each UE in the group may measure the reference signal. In some cases, the group proximity message may reduce a beam sweep signaling overhead for the base station. For example, the base station may update a beam sweep pattern for the group of UEs instead of individually signaling the change to each UE.

Aspects of the disclosure are initially described in the context of a wireless communications system. Aspects of the disclosure are further illustrated by and described with reference to apparatus diagrams, system diagrams, and flow-charts that relate to group indication of spatially proximate UEs.

FIG. 1 illustrates an example of a wireless communications system 100 that supports group indication of spatially proximate UEs in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A base station 105 may wireless communicate with multiple UEs 115 using beamformed communications. In some cases, each beam of the base station 105 may serve multiple UEs 115, such as if the UEs 115 are located in close proximity. Each UE 115 may not use a large amount of bandwidth for its payload, so the UEs 115 may be frequency division multiplexed on the same beam. Grouping spatially close UEs 115 may provide some benefits for a base station 105. For example, when the base station 105 performs beams sweeps, the grouped UEs 115 may be swept together as a group.

To assist a base station 105 in identifying UE groups, a UE 115 may transmit a group proximity message to the base station 105. The group proximity message may indicate that there is a group of UEs 115 that are in proximity of each other. In some cases, the group proximity message may include an approximation of how close the UEs 115 are, such as that the UEs 115 are within a certain radius. The group proximity message may include information for UEs 115 in the group, such as identifiers for the UEs 115, an identifier for the group, proximity metrics like group radius, a leader UE identifier, UE positions, or any combination thereof. The group information may be dynamically updated, for example by transmitting another group proximity message.

The base station 105 may receive the group proximity message and communicate with the group of UEs 115 based on the group proximity message. In some cases, by indicating the group of UEs 115, the base station 105 may be able to reduce a beam measurement and report overhead. For example, the base station 105 may configure just a subset of UEs 115 in the group for beam measurement and reporting, and the base station 105 may then use the same beam for each UE 115 in the group. In some cases, a reference signal for UE beam measurement may be signaled to a UE 115 of the group (e.g., just one UE 115 of the group), and each UE 115 in the group may measure the reference signal. In some cases, the group proximity message may reduce a beam sweep signaling overhead for the base station. For example, the base station 105 may update a beam sweep pattern for the group of UEs 115 instead of individually signaling the change to each UE 115.

Figure 2:
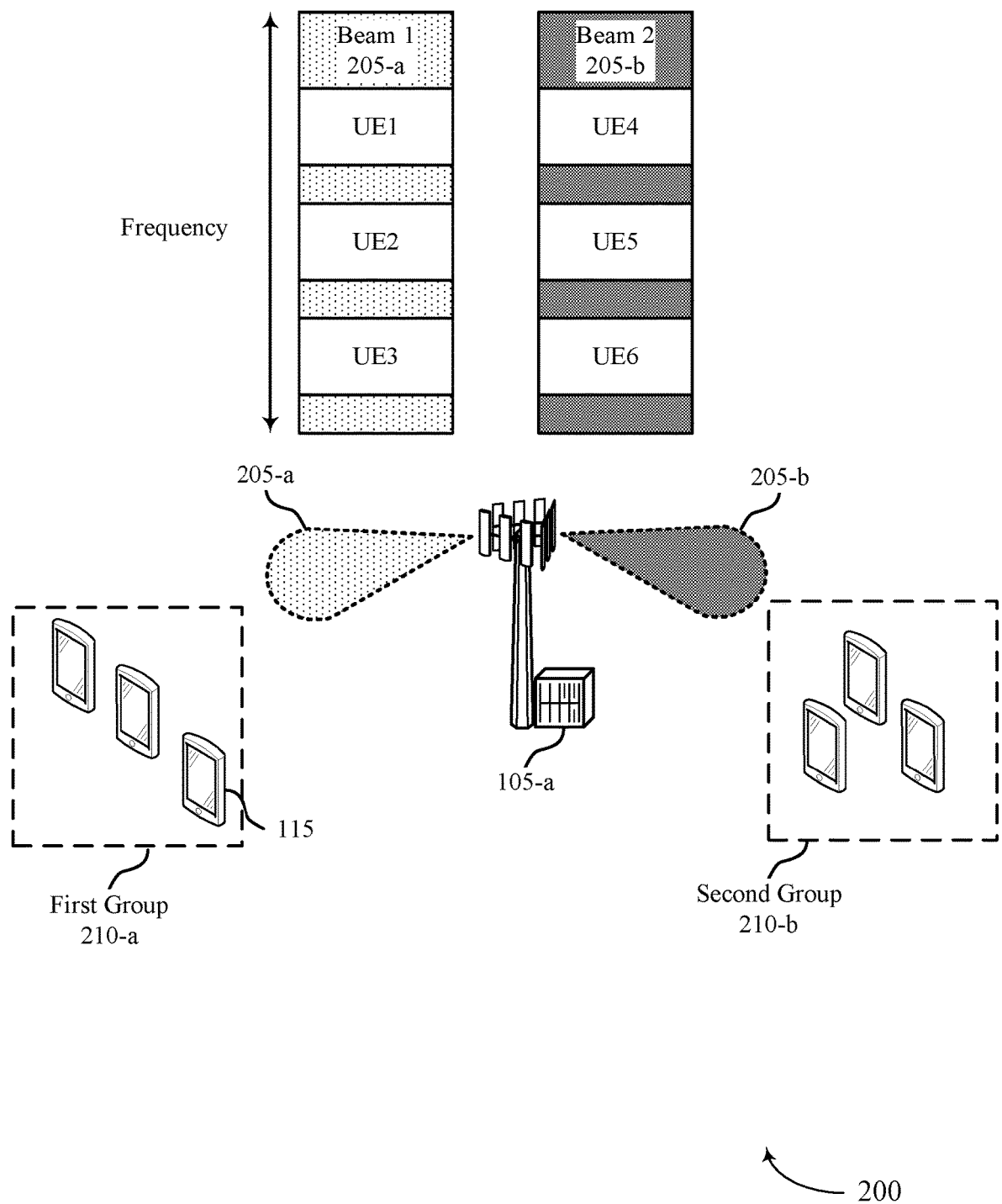
FIG. 2 illustrates an example of a wireless communications system in accordance with aspects of the present disclosure.

FIG. 2 illustrates an example of a wireless communications system 200 in accordance with aspects of the present disclosure. In some examples, wireless communications system 200 may implement aspects of wireless communication system 100. The wireless communications system may include base station 105-a and UEs 115, which may be respective examples of a base station 105 and UEs 115 as described with reference to FIG. 1.

The wireless communications systems 200 may support beamformed communications. For example, base station 105-a may directionally transmit to a UE 115 using a transmit beam 205, and the UE 115 may directionally monitor for the transmission using a receive beam. In an example, base station 105-a may communicate with two UEs 115 in different directions from base station 105-a. Base station 105-a may transmit to a first UE 115 with a first beam, and base station 105-a may transmit to a second UE 115 with a second beam.

In some cases, each beam 205 (e.g., each base station beam) may serve multiple UEs 115. For example, when UEs 115 are densely distributed (e.g., multiple UEs 115 are located in close proximity) or when an antenna array is split into multiple sub-arrays for multi-user (MU) MIMO (MU-MIMO), each beam may serve multiple UEs 115. In an example, a first beam 205-a may serve a first group 210-a of UEs 115, and a second beam 205-*b* may serve a second group 210-*b* of UEs 115. The first group 210-*a* of UEs 115 may include three UEs 115 (e.g., UE1, UE2, and UE3). The second group 210-*b* of UEs 115 may also include three UEs 115 (e.g., UE4, UE5, and UE6). In other examples, a group 210 of UEs 115 may include a different number of UEs 115.

In some cases, a UE 115 may not use a large amount of bandwidth for its payload. For example, in an Internet of Things (IOT) system, such as an industrial IOT (IIOT) system, a scheduled UE may use less bandwidth than allocated for its payload (e.g., may not need the large bandwidth for its payload). Therefore, UEs 115 may be grouped such that the grouped UEs 115 can be served by the same beams or close beams (e.g., spatially close) by frequency division multiplexing the grouped UEs 115 to save spatial dimensions for multiplexing UEs 115 in different directions. For example, the first group 210-*a* of UEs 115 may be in close proximity to each other and each use a relatively small amount of bandwidth for communications. Therefore, base station 105-*a* may communicate with the first group 210-*a* of UEs 115 using the first beam 205-*a*, and each UE 115 of the first group 210-*a* may be assigned a different portion of bandwidth on the first beam 205-*a*.

Grouping spatially close UEs 115 may provide some benefits for a base station 105 performing multiple beams sweeps. For example, the grouped UEs 115 may be swept altogether as a group. In some cases, a group formation may be updated based on UE and environmental mobility. For example, if UE1 was originally closest to base station 105-*a* but moves to a positional spatially farthest away compared to the other UEs 115 in the first group 210-*a* (e.g., compared to UE2 and UE3), base station 105-*a* may manage and keep track of the positions, and relative positions, of the UEs 115 in the first group 210-*a* (e.g., based on positioning reports transmitted by the UEs 115). The wireless communications system 200 may support techniques for managing UE and UE group proximity and location.

For example, a UE 115 may indicate to base station 105-*a* that there is a group 210 of UEs 115 that are in proximity of each other. The UE 115 may transmit a group proximity message to indicate the group 210 of UEs 115. In an example, the first group 210-*a* of UEs 115 may be in a car, on a moving robot, or on different vehicles in platooning. UE1 of the first group 210-*a* of UEs 115 may transmit an indication to base station 105-*a* that UE1, UE2, and UE3 are in close proximity. In some cases, the indication may include an approximation of how close the UEs 115 are, such as that the UEs 115 are included within a certain radius (e.g., within X meters). The radius may be, for example, a group radius. In some cases, devices within a radius of one meter may be considered high density, and devices included within a radius of two meters may be considered normal density. In some examples, multiple UEs 115 of the group 210 may transmit the group proximity message of the group 210 to base station 105-*a*.

A UE 115 may detect that there are other UEs 115 in close proximity using multiple different techniques. For example, UEs 115 may communicate using device-to-device (D2D) communications, and two UEs 115 may determine they are within close spatial proximity based on a D2D range estimation. In some cases, two UEs 115 may detect a same beacon (e.g., from a single vehicle), and the UEs 115 may determine that they can each detect the beacon. In some cases, a fixed group of UEs 115 may be installed on a same moving object. In some examples, the fixed group of UEs 115 may be preconfigured to identify the fixed group. In some cases, UEs 115 of a group 210 may form a communication group, such as UEs 115 used in vehicle platooning.

The group proximity message indicating the group 210 may include information for UEs 115 in the group 210. For example, the indication may include identifiers for the UEs 115, proximity metrics (e.g., proximity metric data) such as group radius, a leader UE ID, UE positions, or any combination thereof. In some cases, a leader UE may be identified based on proximity or other factors (e.g., capability, device type, etc.). The group information may be dynamically updated. For example, if a UE 115 leaves the proximity of the group 210 (e.g., moves to a position outside the group radius), a UE 115 of the group 210 (e.g., the UE 115 that left the proximity of the group 210, another UE 115 of the group 210) may transmit another indication, including an indicator that one or more UEs 115 have left the group 210. UE indication of proximity may assist base station 105-*a*, as base station 105-*a* may not constantly poll positioning data from individual UEs 115.

Base station 105-*a* may receive the group proximity message and communicate with the group 210 of UEs 115 based on information in the group proximity message. In some aspects, the group proximity message may indicate that the group 210 of UEs 115 are located within the defined proximity of each other based on UE position data for one or more UEs 115 within the group 210 of UEs 115. In some examples, base station 105-*a* may receive a set of UE identifiers associated with (e.g., which belong with) a particular group identifier. Base station 105-*a* may determine the UEs 115 in close proximity (e.g., based on a threshold, for example, inside a group radius) based on UE position data (e.g., a positioning report) provided by each UE 115. In some cases, by indicating the group 210 of UEs 115, base station 105-*a* may be able to reduce a beam measurement and report overhead. For example, if UE angular spread (e.g., from base station 105-*a* to the UEs 115 in the group 210) is smaller than a base station beam width, base station 105-*a* may transmit a beam configuration that configures a subset of UEs 115 in the group 210 for beam measurement and reporting. Base station 105-*a* may then use the same base station beam 205 for all UEs 115 in the group 210.

For example, UE1, UE2, and UE3 in the first group 210-*a* may be close enough together (e.g., based on proximity, for example, inside a group radius) that the UE angular spread measured at base station 105-*a* is smaller than the width of a beam 205 of base station 105-*a*. For example, if each UE 115 of the first group 210-*a* had an individual beam 205, the beams would significantly overlap given the beam width and proximity of the UEs 115. Therefore, instead, base station 105-*a* may transmit a beam configuration that configures just UE1 of the first group 210-*a* for beam measurement and reporting. Base station 105-*a* may select the first beam 205-*a* and use the first beam 205-*a* for each UE 115 in the first group 210-*a*. In some cases, base station 105-*a* may determine to configure UE1 for beam measurement and reporting based on a proximity, capability, signal strength, or other factors, of UE1.

A reference signal for UE beam measurement may be signaled to a UE 115 of the first group 210-*a*, for example, just one UE 115 of the first group 210-*a* (e.g., UE1), and each UE 115 in the first group 210-*a* may measure the reference signal. For example, base station 105-*a* may transmit a reference signal for UE beam refinement to UE1, and the same reference signal may be measured by UE2 and UE3. If the UEs 115 in the group 210 move in a predetermined pattern, a same pre-determined beam switch sequence may be applied to the UE group. For example, if the group 210 of UEs 115 move in a same direction (e.g., and maintain a similar proximity, for example, a proximity within a threshold), base station 105-a may switch beams and use the new beam for each UE 115 in the group 210. For example, the base station 105-a may switch from using individual beams for each of the UEs 115 to using the same beam for each UE 115 in the group 210.

For some UE group formations (e.g., in a vehicle platoon), base station 105-a may transmit a beam configuration to configure a subset of UEs 115 in the group 210 for beam measurement and reporting, such as UEs 115 at edges of the formation. In an example two UEs 115 at the both edges of a formation of a group 210 of UEs 115 may be configured for beam measurement and reporting, and other UEs 115 in the group 210 may not be configured for beam measurement and reporting. Based on determined beams for the two UEs 115, base station 105-a may select beams 205 for each UE 115 in the group 210 based on their relative positions in the formation. In some aspects, base station 105-a may provide a beam configuration for the group 210 of UEs 115 through a multicast message or broadcast message for the group 210 of UEs 115. The multicast message or broadcast message may indicate a beam 205 selected by base station 105-a for each UE 115 in the group 210 of UEs 115. In some aspects, the broadcast or multicast message may include group common downlink control information (DCI) or a medium access control (MAC) control element (MAC-CE). In some examples, the DCI may include a group common DCI associated with the group 210. In some aspects, the group common DCI may be scrambled based on a radio network temporary identifier (RNTI) associated with all the UEs 115 in the group 210. The RNTI may be indicated by the base station 105-a to each UE 115 in the group 210.

In some cases, the group proximity message may reduce a beam sweep signaling overhead for base station 105-a. Base station 105-a may update (e.g., via signaling) a same beam sweep pattern for the group 210 of UEs 115 to save individual signaling overhead. For example, instead of indicating an updated beam sweep pattern for each UE 115 in the first group 210-a, base station 105-a may transmit a beam configuration that provides an indication of the updated beam sweep pattern to a UE 115 of the first group 210-a (e.g., to just UE1). UE1 may then indicate the updated beam sweep pattern to the other UEs 115 in the first group 210-a. The base station 105-a may then perform a beam sweep procedure in accordance with the indicated beam sweep pattern to enable the base station 105-a, UEs in the first group 210-a, or both, to select beams for uplink and downlink transmission.

Figure 3:
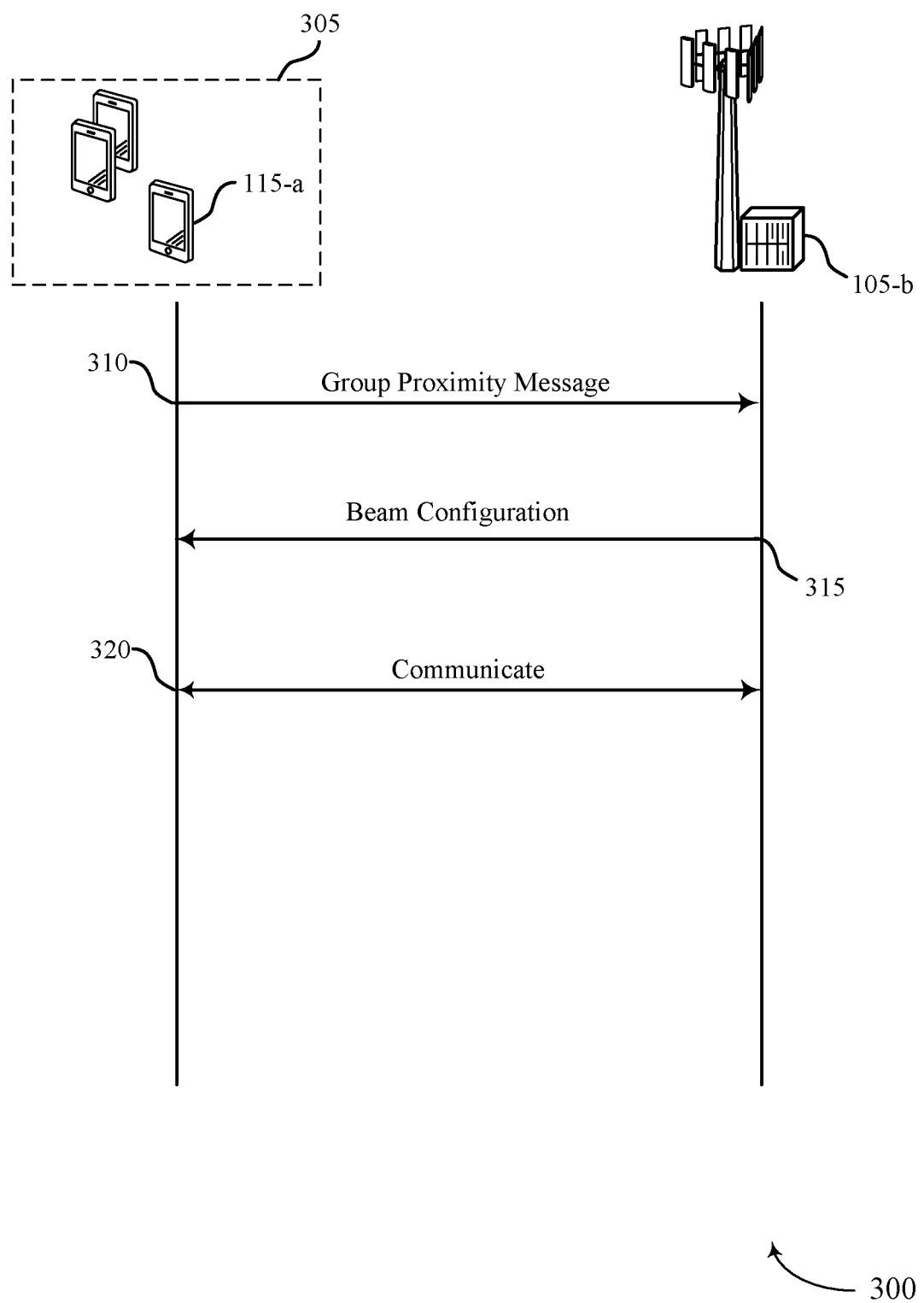
FIG. 3 illustrates an example of a process flow in accordance with aspects of the present disclosure.

FIG. 3 illustrates an example of a process flow 300 in accordance with aspects of the present disclosure. In some examples, process flow 300 may implement aspects of wireless communication system 100. Process flow 300 includes UE 115-a and base station 105-b, which may be respective examples of a UE 115 and a base station 105 as described with reference to FIG. 1. UE 115-a may be spatially close to other UEs 115, forming a group 305 of UEs 115. The group 305 may include aspects of a group 210 of UEs 115 as described with reference to FIG. 2.

UE 115-a may identify other UEs 115 in close proximity. For example, UE 115-a may detect other UEs 115 in close proximity based on D2D communications, receiving a common beacon signal, etc. At 310, UE 115-a may transmit a group proximity message indicating that the group 305 of UEs 115 including UE 115-a and, at least, a second UE 115 are located within a defined proximity of each other. For example, the UEs 115 of the group 305 may be within a radius of a meter (e.g., for high density) or two meters (e.g., for normal density). The group proximity message may be transmitted to base station 105-b. In some other examples, the group proximity message may be transmitted to a relay node or an intermediate communications device managing the group 305.

In some cases, the group proximity message may include a group identifier for the group of UEs. In some examples, the group proximity message may include group information for the group of UEs 115. In some cases, the group information includes a UE identifier for one or more UEs within the group of UEs, proximity metric data, group radius data, a leader identifier, UE position data, or any combination thereof. At 315, UE 115-a may receive a beam configuration for the group of UEs based on the group proximity message. At 320, UE 115-a may communicate with base station 105-b based on the beam configuration.

In some cases, the beam configuration may reduce beam measurement and report overhead for base station 105-b. For example, base station 105-b may use the beam configuration to configure a UE 115 of the group 305, for example, just one UE (e.g., UE 115-a) of the group 305 for beam measurement and reporting, and base station 105-b may select the same beam for all UEs 115 in the group 305 based on the beam measurement and reporting of UE 115-a. If the UE angular spread of the UEs 115 in the group 305 is smaller than the width of a beam used by base station 105-a, then base station 105-a may configure a UE 115 of the group 305, for example, just one UE 115 of the group 305.

For example, the beam configuration may indicate a beam measurement reporting configuration for the group 305 of UEs 115. Then, at 320, UE 115-a may transmit a beam measurement report to the base station for the group 305 of UEs 115 based on the beam measurement reporting configuration. In some case, UE 115-a may monitor for a data transmission or a control transmission from base station 105-b via a beam selected for transmissions to the group 305 of UEs 115 based on the beam measurement report.

In another example, for certain UE group formations, base station 105-b may use the beam configuration to configure a subset of UEs 115 in the group 305 for beam measurement and reporting. For example, base station 105-b may configure UE 115-a and a second UE 115 for beam measurement and reporting, but other UEs 115 in the group may not be configured for beam measurement and reporting. In an example, the beam configuration may indicate a first beam measurement reporting configuration for a first subset of the group of UEs, the first subset including UE 115-a, and a second beam measurement reporting configuration for a second subset of the group of UEs. Then, at 320, UE 115-a may transmit a first beam measurement report to base station 105-a for the first subset based on the first beam measurement reporting configuration, and a UE in the second subset may transmit a second beam measurement report to base station 105-a for the second subset based on the second beam measurement reporting configuration. UE 115-a may monitor for a data transmission or a control transmission from base station 105-b via a beam selected by base station 105-b for transmission to the first subset based on the first beam measurement report. The UE in the second subset may similarly monitor for a data transmission or a control transmission from base station 105-b via a beam selected by base station 105-b for transmission to the second subset based on the second beam measurement report.

Additionally, base station 105-a may transmit the beam configuration 315 that provides an indication of a beam sweep pattern to UE 115-a. UE 115-a may then indicate the beam sweep pattern to the other UEs 115 in the group. The base station 105-b may then perform a beam sweep procedure in accordance with the indicated beam sweep pattern to enable the base station 105-b, UEs in the group, or both, to select beams for communicating uplink and/or downlink transmissions at 320.

Figure 4:
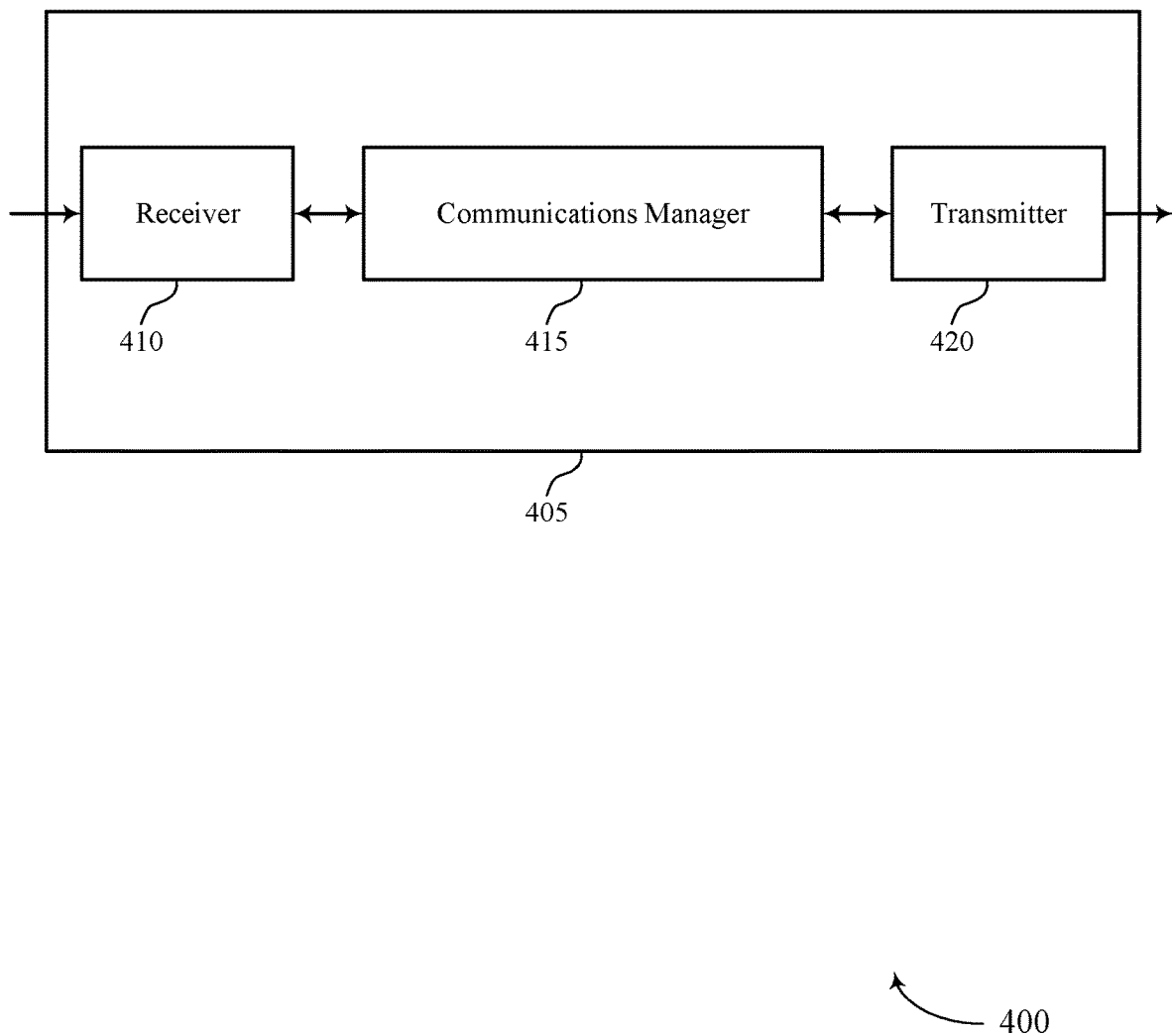
FIGS. 4 and 5 show block diagrams of devices in accordance with aspects of the present disclosure.

FIG. 4 shows a block diagram 400 of a device 405 in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to group indication of spatially proximate UEs, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may transmit a group proximity message indicating that a group of UEs including the first UE and a second UE are located within a defined proximity of each other, receive a beam configuration for the group of UEs based on the group proximity message, and communicate with a base station based on the beam configuration. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a DSP, an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
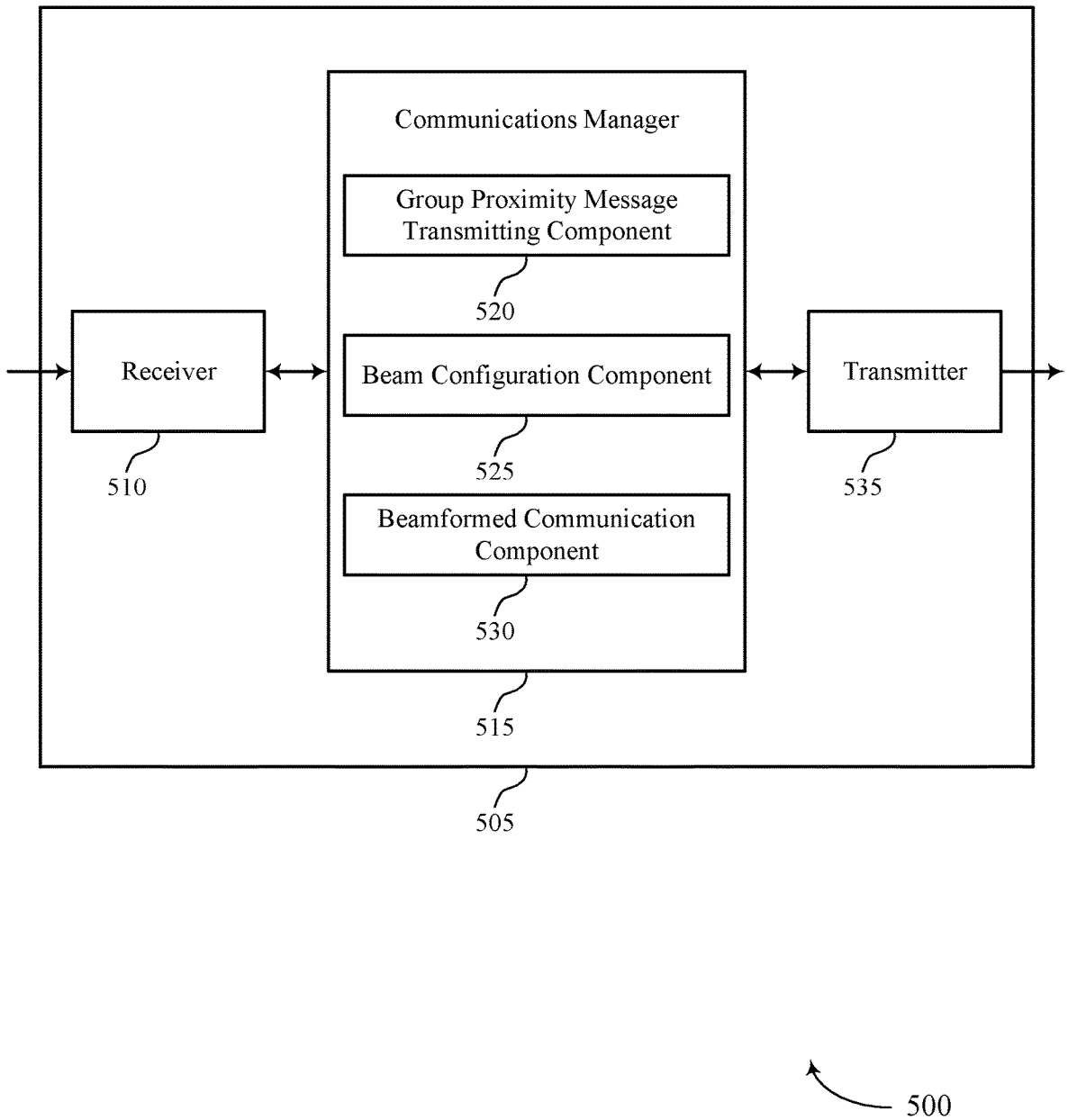

FIG. 5 shows a block diagram 500 of a device 505 in accordance with aspects of the present disclosure. The device 505 may be an example of aspects of a device 405, or a UE 115 as described herein. The device 505 may include a receiver 510, a communications manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to group indication of spatially proximate UEs, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a group proximity message transmitting component 520, a beam configuration component 525, and a beamformed communication component 530. The communications manager 515 may be an example of aspects of the communications manager 710 described herein.

The group proximity message transmitting component 520 may transmit a group proximity message indicating that a group of UEs including the first UE and a second UE are located within a defined proximity of each other. The beam configuration component 525 may receive a beam configuration for the group of UEs based on the group proximity message. The beamformed communication component 530 may communicate with a base station based on the beam configuration.

The transmitter 535 may transmit signals generated by other components of the device 505. In some examples, the transmitter 535 may be collocated with a receiver 510 in a transceiver module. For example, the transmitter 535 may be an example of aspects of the transceiver 720 described with reference to FIG. 7. The transmitter 535 may utilize a single antenna or a set of antennas.

Figure 6:
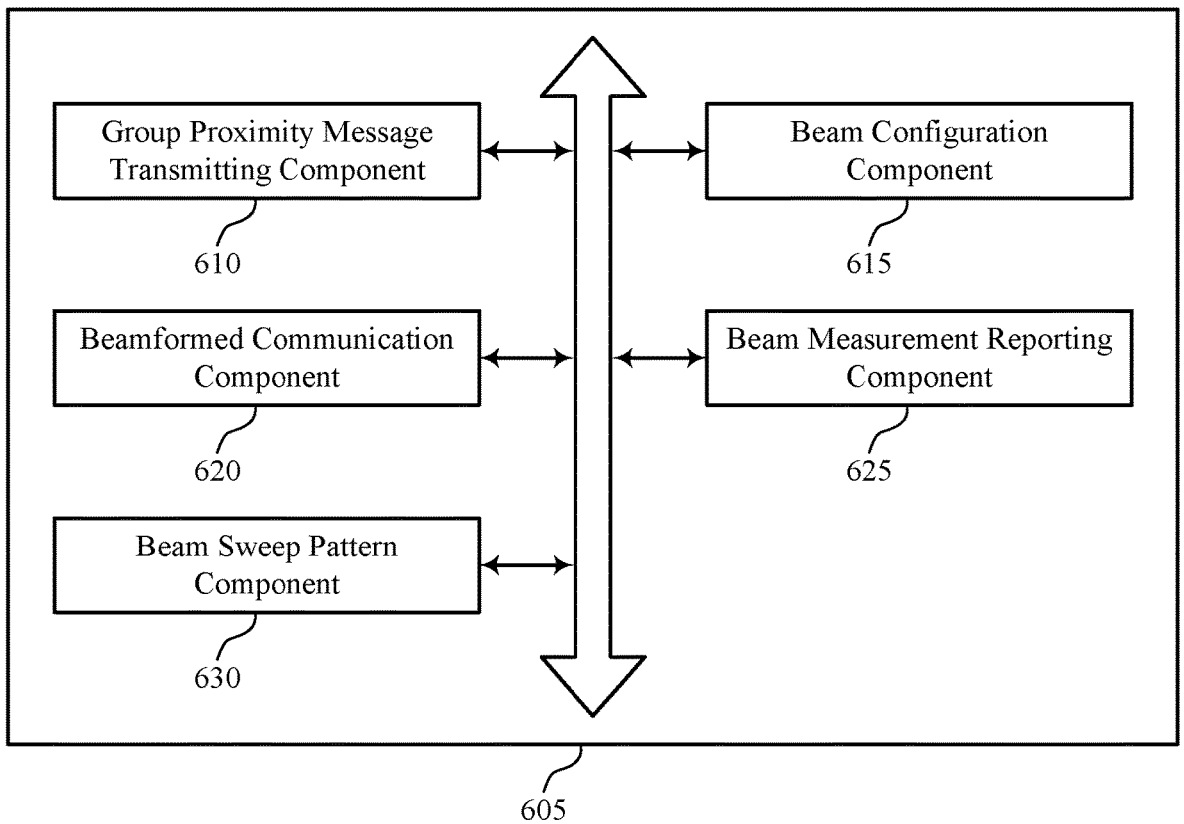
FIG. 6 shows a block diagram of a communications manager in accordance with aspects of the present disclosure.

FIG. 6 shows a block diagram 600 of a communications manager 605 in accordance with aspects of the present disclosure. The communications manager 605 may be an example of aspects of a communications manager 415, a communications manager 515, or a communications manager 710 described herein. The communications manager 605 may include a group proximity message transmitting component 610, a beam configuration component 615, a beamformed communication component 620, a beam measurement reporting component 625, and a beam sweep pattern component 630. Each of these modules may communicate, directly or indirectly, with one another (e.g., via one or more buses).

The group proximity message transmitting component 610 may transmit a group proximity message indicating that a group of UEs including the first UE and a second UE are located within a defined proximity of each other. In some examples, the group proximity message transmitting component 610 may transmit a group identifier for the group of UEs. In some examples, the group proximity message transmitting component 610 may transmit group information for the group of UEs. In some cases, the group information includes one or more of a UE identifier for one or more UEs within the group of UEs, proximity metric data, group radius data, a leader identifier, UE position data, or any combination thereof.

The beam configuration component 615 may receive a beam configuration for the group of UEs based on the group proximity message. The beamformed communication component 620 may communicate with a base station based on the beam configuration.

The beam measurement reporting component 625 may receive the beam configuration that indicates a beam measurement reporting configuration for the group of UEs. In some examples, the beam measurement reporting component 625 may transmit, by the first UE, a beam measurement report to the base station for the group of UEs based on the beam measurement reporting configuration. In some examples, the beam measurement reporting component 625 may monitor for a data transmission or a control transmission from the base station via a beam selected for transmissions to the group of UEs based on the beam measurement report.

In some examples, the beam measurement reporting component 625 may receive the beam configuration that indicates a beam measurement reporting configuration for a first subset of the group of UEs, the first subset including the first UE.

In some examples, the beam measurement reporting component 625 may transmit, by the first UE, a beam measurement report to the base station for the first subset based on the beam measurement reporting configuration. In some examples, the beam measurement reporting component 625 may monitor for a data transmission or a control transmission from the base station via a beam selected for transmissions to the first subset based on the beam measurement report.

In some examples, the beam measurement reporting component 625 may receive a broadcast message or a multicast message for the group of UEs indicating a beam selected by the base station for each UE in the group of UEs, where the communicating with the base station may be based on the broadcast message or the multicast message. In some cases, the broadcast message or the multicast message may include DCI or a MAC-CE. In some cases, the DCI may include a group common DCI. In some cases, the group common DCI may be scrambled using a RNTI associated with the group of UEs.

In some cases, the first UE and the second UE are at respective edges of a formation of the group of UEs, and where a beam is selected by the base station for each UE in the group based on relative positions of respective UEs in the group of UEs.

The beam sweep pattern component 630 may receive the beam configuration that indicates a beam sweep pattern for the group of UEs, where communicating with the base station is in accordance with the beam sweep pattern.

Figure 7:
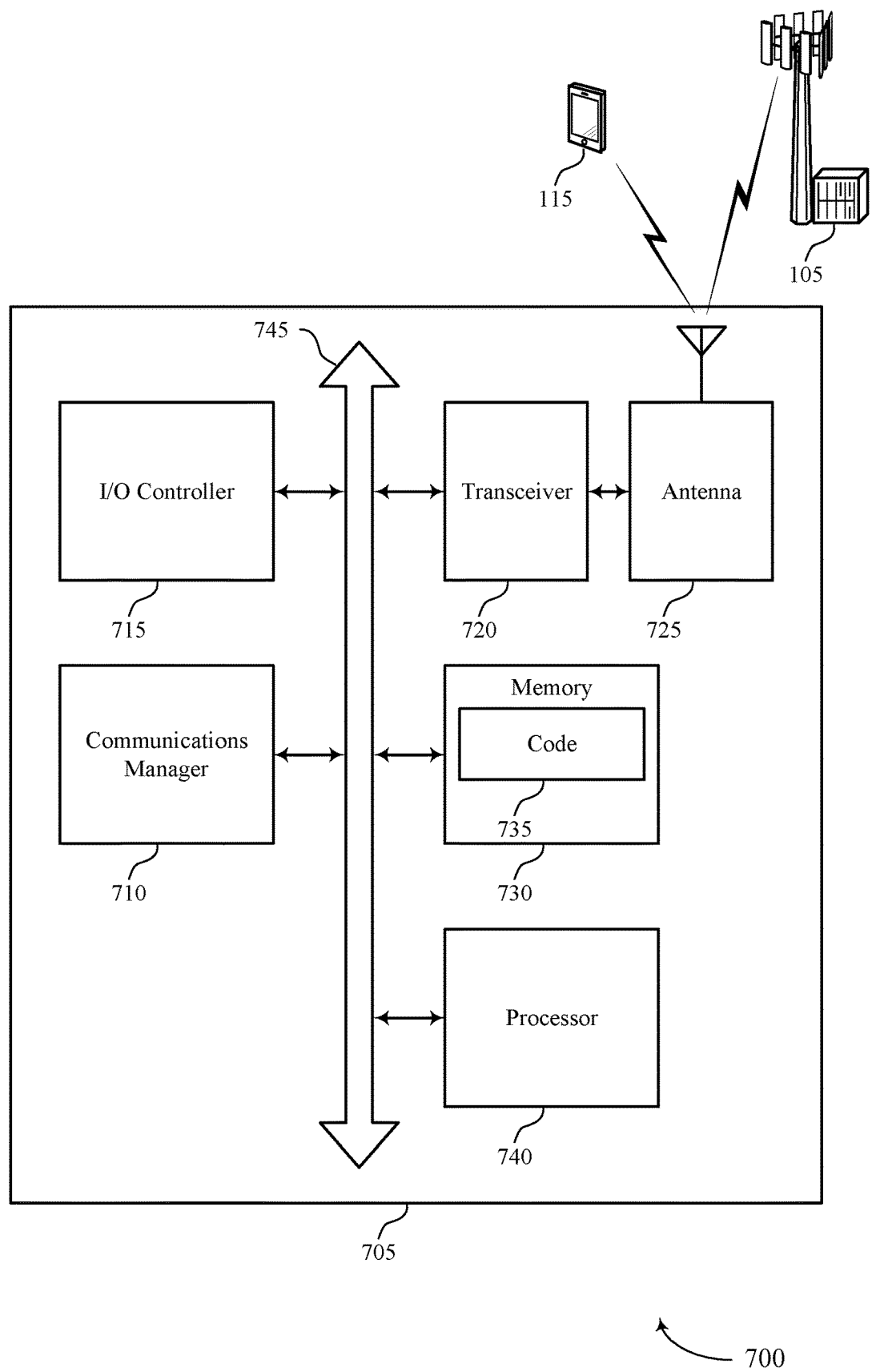
FIG. 7 shows a diagram of a system including a device in accordance with aspects of the present disclosure.

FIG. 7 shows a diagram of a system 700 including a device 705 in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may transmit a group proximity message indicating that a group of UEs including the first UE and a second UE are located within a defined proximity of each other, receive a beam configuration for the group of UEs based on the group proximity message, and communicate with a base station based on the beam configuration.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a BIOS which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting group indication of spatially proximate UEs).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
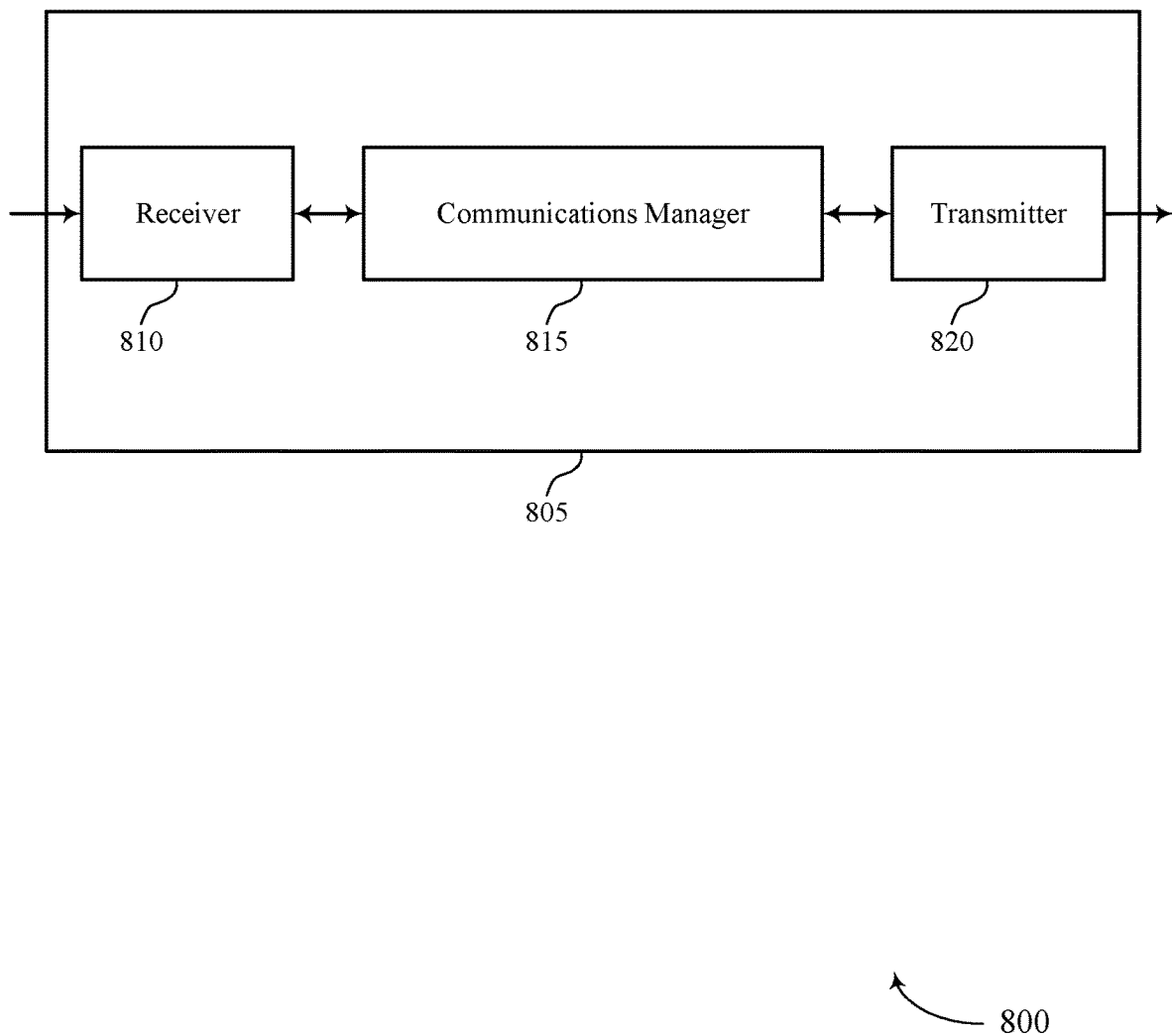
FIGS. 8 and 9 show block diagrams of devices in accordance with aspects of the present disclosure.

FIG. 8 shows a block diagram 800 of a device 805 in accordance with aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to group indication of spatially proximate UEs, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may receive a group proximity message indicating that a group of UEs including a first UE and a second UE are located within a defined proximity of each other, transmit a beam configuration for the group of UEs based on the group proximity message, and communicate with the group of UEs based on the beam configuration. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The actions performed by the communications manager 815 as described herein may be implemented to realize one or more potential advantages. One implementation may allow a base station 105 to reduce overhead for managing beamforming configurations for UEs 115 in close proximity. By receiving a group proximity message from a UE 115, a base station 105 may perform efficient signaling by indicating beamforming configurations for the group of UEs 115 instead of indicating beamforming configurations for each of the UEs 115 individually. For example, the UEs 115 may be in close enough proximity that the base station 105 can frequency division multiplex the UEs 115 on a same beam. Then, the base station 105 may perform just one beam update and, in some cases, transmit beam update information for a single UE 115. Additionally, the base station 105 may configure a subset of UEs 115 in the group, in some cases a single UE 115, for beam measurement and reporting. This may provide the same granularity of measurement information, or approximately the same, with significantly less overhead for signaling.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
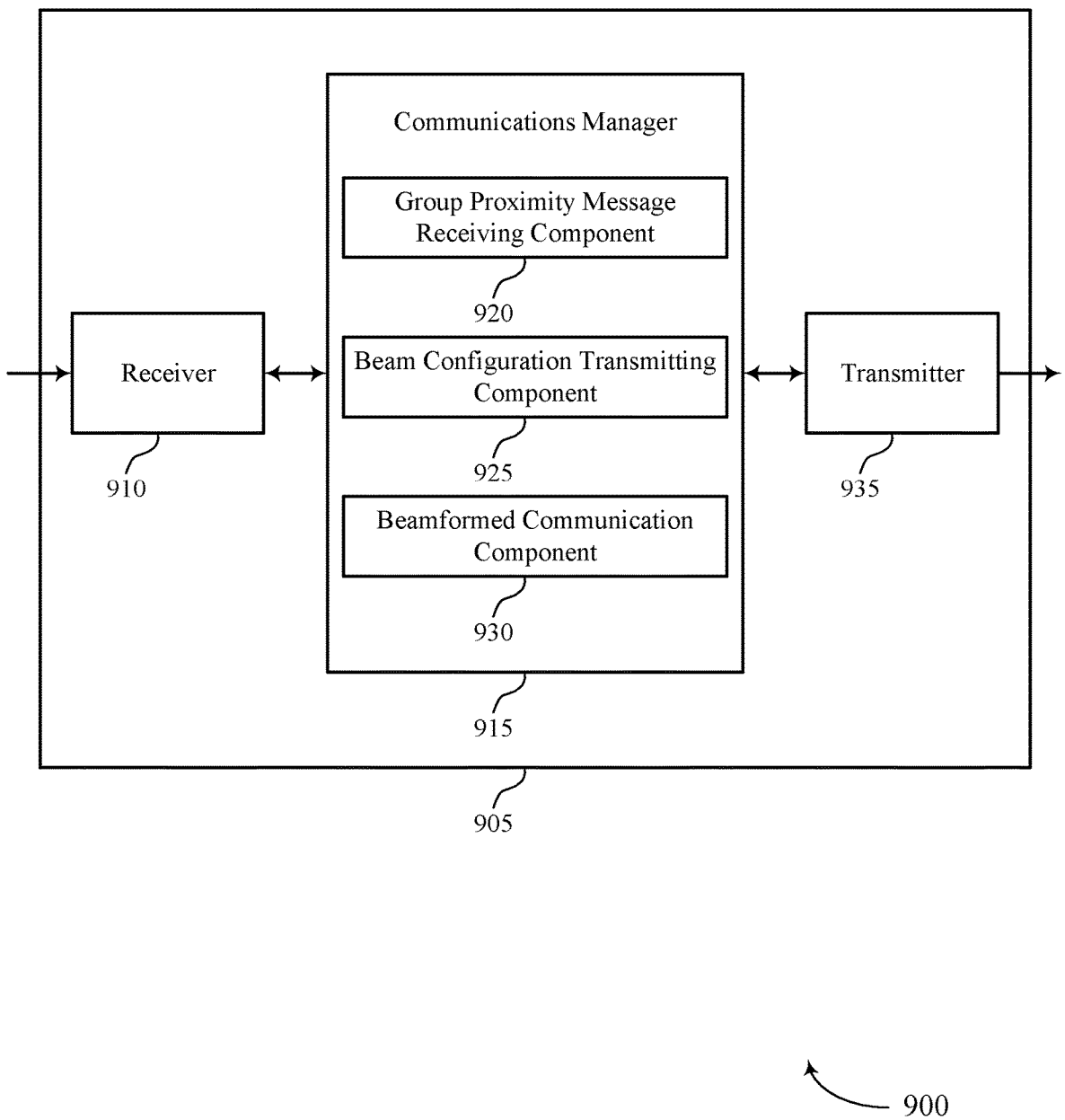

FIG. 9 shows a block diagram 900 of a device 905 in accordance with aspects of the present disclosure. The device 905 may be an example of aspects of a device 805, or a base station 105 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to group indication of spatially proximate UEs, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a group proximity message receiving component 920, a beam configuration transmitting component 925, and a beamformed communication component 930. The communications manager 915 may be an example of aspects of the communications manager 1110 described herein.

The group proximity message receiving component 920 may receive a group proximity message indicating that a group of UEs including a first UE and a second UE are located within a defined proximity of each other. The beam configuration transmitting component 925 may transmit a beam configuration for the group of UEs based on the group proximity message. The beamformed communication component 930 may communicate with the group of UEs based on the beam configuration.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
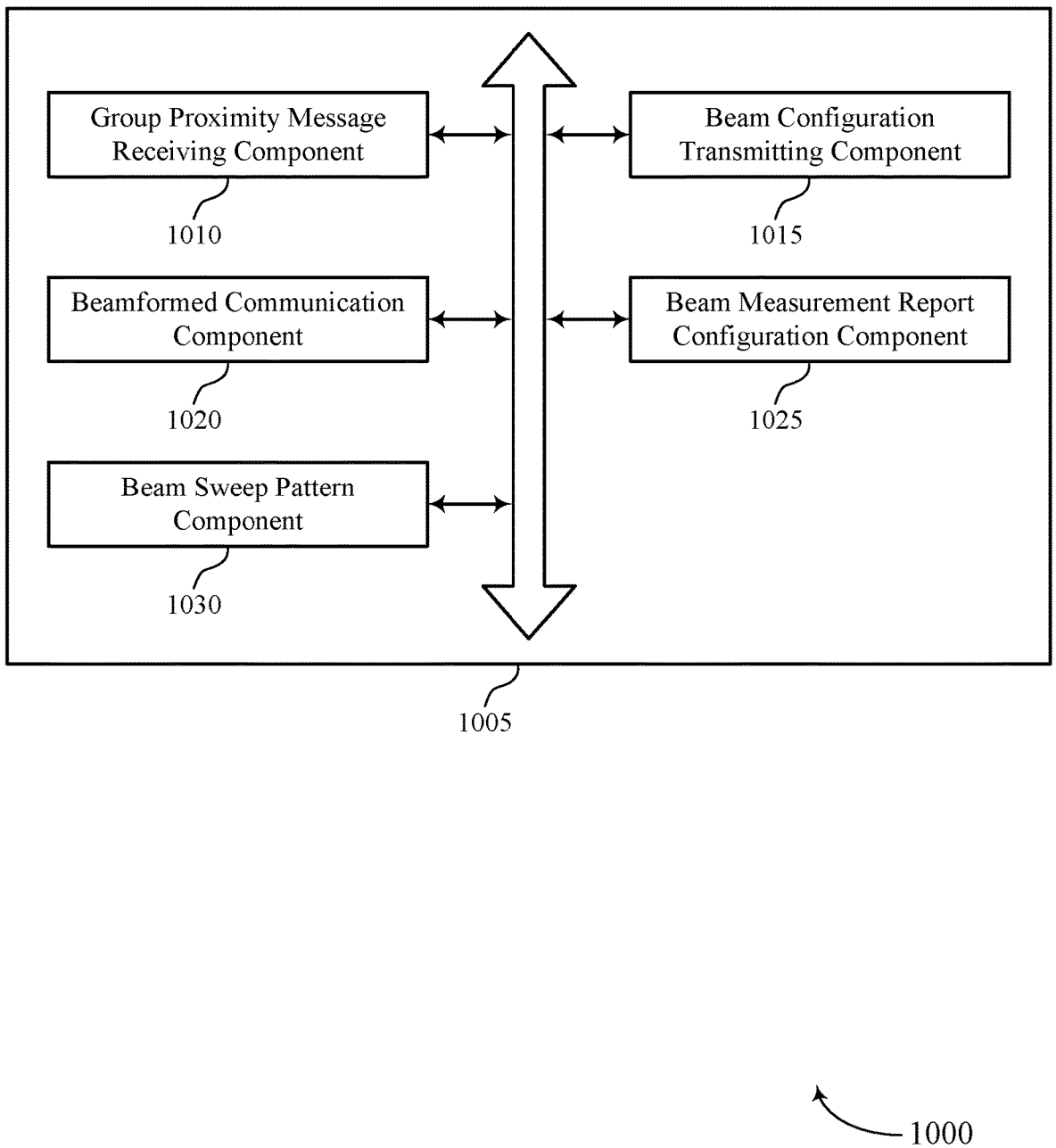
FIG. 10 shows a block diagram of a communications manager in accordance with aspects of the present disclosure.

FIG. 10 shows a block diagram 1000 of a communications manager 1005 in accordance with aspects of the present disclosure. The communications manager 1005 may be an example of aspects of a communications manager 815, a communications manager 915, or a communications manager 1110 described herein. The communications manager 1005 may include a group proximity message receiving component 1010, a beam configuration transmitting component 1015, a beamformed communication component 1020, a beam measurement report configuration component 1025, and a beam sweep pattern component 1030. Each of these modules may communicate, directly or indirectly, with one another (e.g., via one or more buses).

The group proximity message receiving component 1010 may receive a group proximity message indicating that a group of UEs including a first UE and a second UE are located within a defined proximity of each other. In some examples, the group proximity message receiving component 1010 may receive the group proximity message that indicates movement sequence information for one or more UEs in the group of UEs.

In some examples, the group proximity message receiving component 1010 may receive a group identifier for the group of UEs. In some examples, the group proximity message receiving component 1010 may receive a set of UE identifiers associated with the group identifier, where the set of UE identifiers may correspond to the first UE and the second UE. In some examples, the group proximity message receiving component 1010 may receive group information for the group of UEs. In some cases, the group information includes one or more of a UE identifier for one or more UEs within the group of UEs, proximity metric data, group radius data, a leader identifier, UE position data, or any combination thereof. In some cases, the group proximity message may indicate that the group of UEs including the first UE and the second UE are located within the defined proximity of each other based on UE position data for one or more UEs within the group of UEs.

The beam configuration transmitting component 1015 may transmit a beam configuration for the group of UEs based on the group proximity message. The beamformed communication component 1020 may communicate with the group of UEs based on the beam configuration.

The beam measurement report configuration component 1025 may transmit the beam configuration that indicates a beam measurement reporting configuration for the group of UEs. In some examples, the beam measurement report configuration component 1025 may receive, from a first UE of the group of UEs, a beam measurement report for the group of UEs based on the beam measurement reporting configuration.

In some examples, the beam measurement report configuration component 1025 may transmit a data transmission or a control transmission to one or more UEs of the group of UEs via a beam selected for transmissions to the group of UEs based on the beam measurement report.

In some examples, the beam measurement report configuration component 1025 may transmit the beam configuration that indicates a first beam measurement reporting configuration for a first subset of the group of UEs and a second beam measurement reporting configuration for a second subset of the group of UEs.

In some examples, the beam measurement report configuration component 1025 may select a beam for each UE in the group based on relative positions of respective UEs in the group. In some examples, the beam measurement report configuration component 1025 may receive, from a first UE of the group of UEs, a first beam measurement report for the first subset based on the first beam measurement reporting configuration.

In some examples, the beam measurement report configuration component 1025 may receive, from a second UE of the group of UEs, a second beam measurement report for the second subset based on the second beam measurement reporting configuration. In some examples, the beam measurement report configuration component 1025 may transmit a first data transmission or a first control transmission from the base station to the first subset via a first beam selected for transmissions to the first subset based on the first beam measurement report.

In some examples, the beam measurement report configuration component 1025 may transmit a second data transmission or a second control transmission from the base station to the second subset via a second beam selected for transmissions to the second subset based on the second beam measurement report.

The beam sweep pattern component 1030 may transmit the beam configuration that indicates a beam sweep pattern for the group of UEs, where communicating with the group of UEs is in accordance with the beam sweep pattern.

In some examples, the beam sweep pattern component 1030 may transmit a broadcast message or a multicast message for the group of UEs indicating a beam selected by the base station for each UE in the group of UEs, where the communicating with the group of UEs may be based on the broadcast message or the multicast message. In some cases, the broadcast message or the multicast message may include DCI or a MAC-CE. In some cases, the DCI may include a group common DCI. In some cases, the group common DCI may be scrambled using a RNTI associated with the group of UEs.

Figure 11:
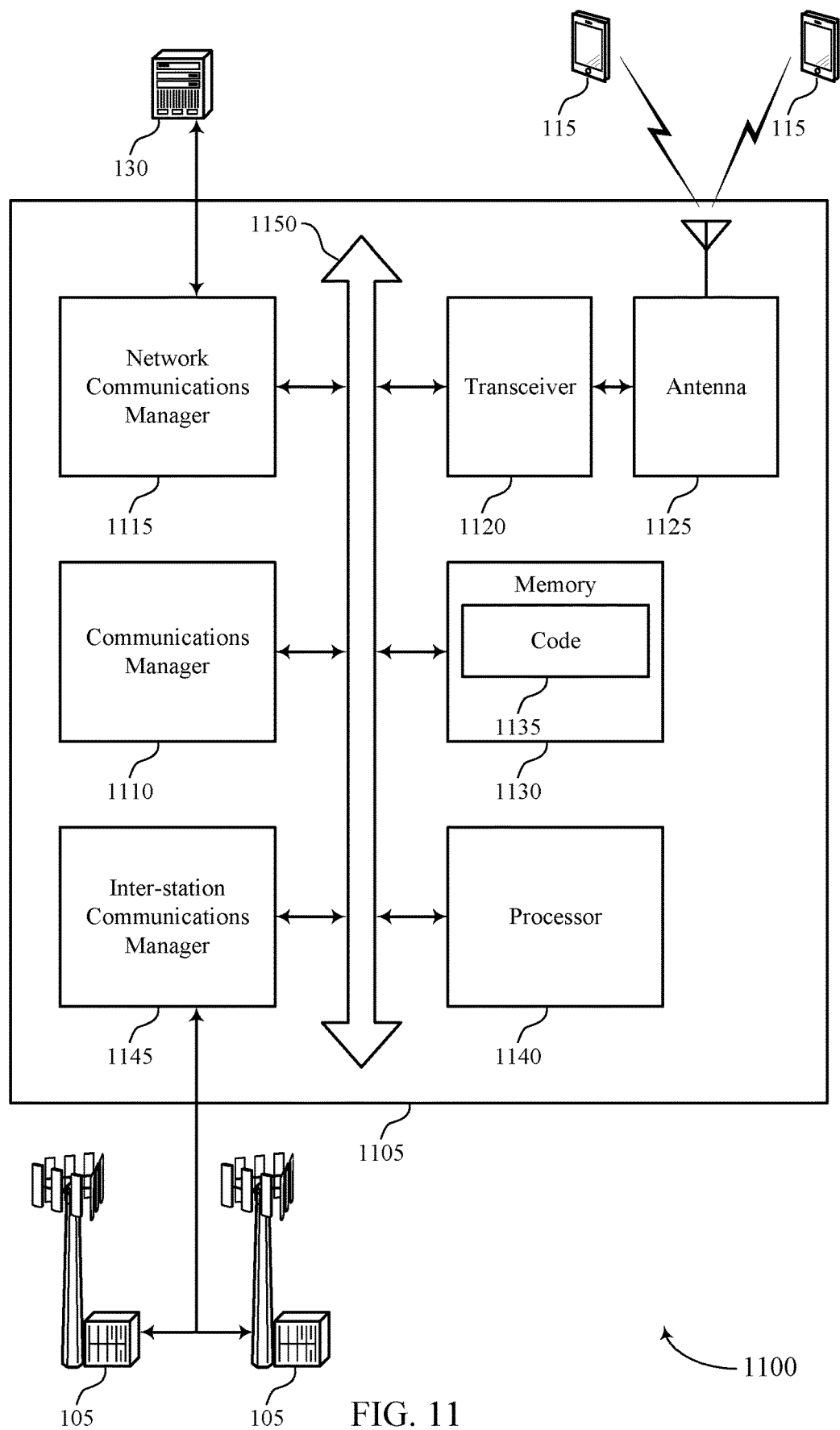
FIG. 11 shows a diagram of a system including a device in accordance with aspects of the present disclosure.

FIG. 11 shows a diagram of a system 1100 including a device 1105 in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may receive a group proximity message indicating that a group of UEs including a first UE and a second UE are located within a defined proximity of each other, transmit a beam configuration for the group of UEs based on the group proximity message, and communicate with the group of UEs based on the beam configuration.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof).

In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting group indication of spatially proximate UEs).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The actions performed by the communications manager 1110 as described herein may be implemented to realize one or more potential advantages at components of the device 1105. For example, by grouping UEs 115 together and reducing a signaling overhead for beam management, power efficiency and resource efficiency at the device 1105 may increase. For example, the device 1105 may have less overhead allocated for beam management signaling, such that the device 1105 can improve data throughput.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
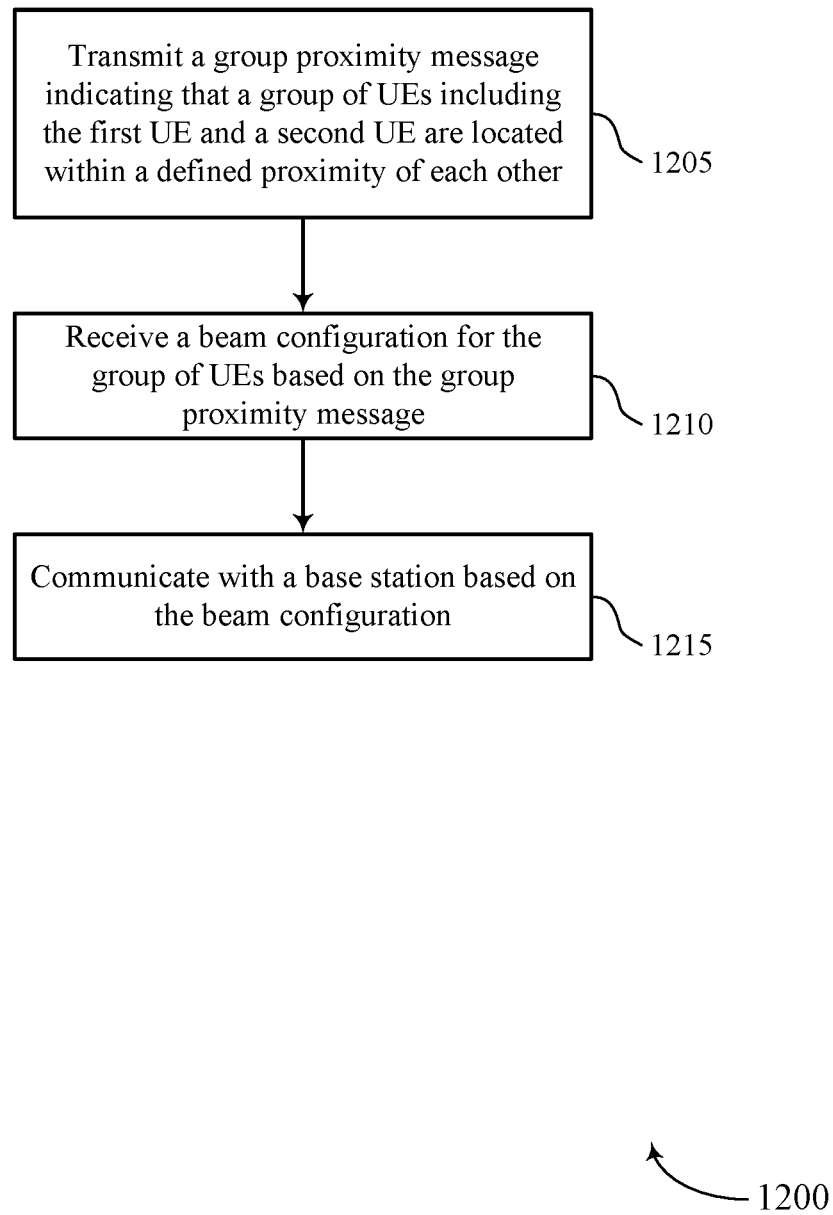
FIGS. 12 through 15 show flowcharts illustrating methods in accordance with aspects of the present disclosure.

FIG. 12 shows a flowchart illustrating a method 1200 in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1205, the UE may transmit a group proximity message indicating that a group of UEs including the first UE and a second UE are located within a defined proximity of each other. The operations of 1205 may be performed according to the methods described herein. In some examples, aspects of the operations of 1205 may be performed by a group proximity message transmitting component as described with reference to FIGS. 4 through 7.

At 1210, the UE may receive a beam configuration for the group of UEs based on the group proximity message. The operations of 1210 may be performed according to the methods described herein. In some examples, aspects of the operations of 1210 may be performed by a beam configuration component as described with reference to FIGS. 4 through 7.

At 1215, the UE may communicate with a base station based on the beam configuration. The operations of 1215 may be performed according to the methods described herein. In some examples, aspects of the operations of 1215 may be performed by a beamformed communication component as described with reference to FIGS. 4 through 7.

Figure 13:
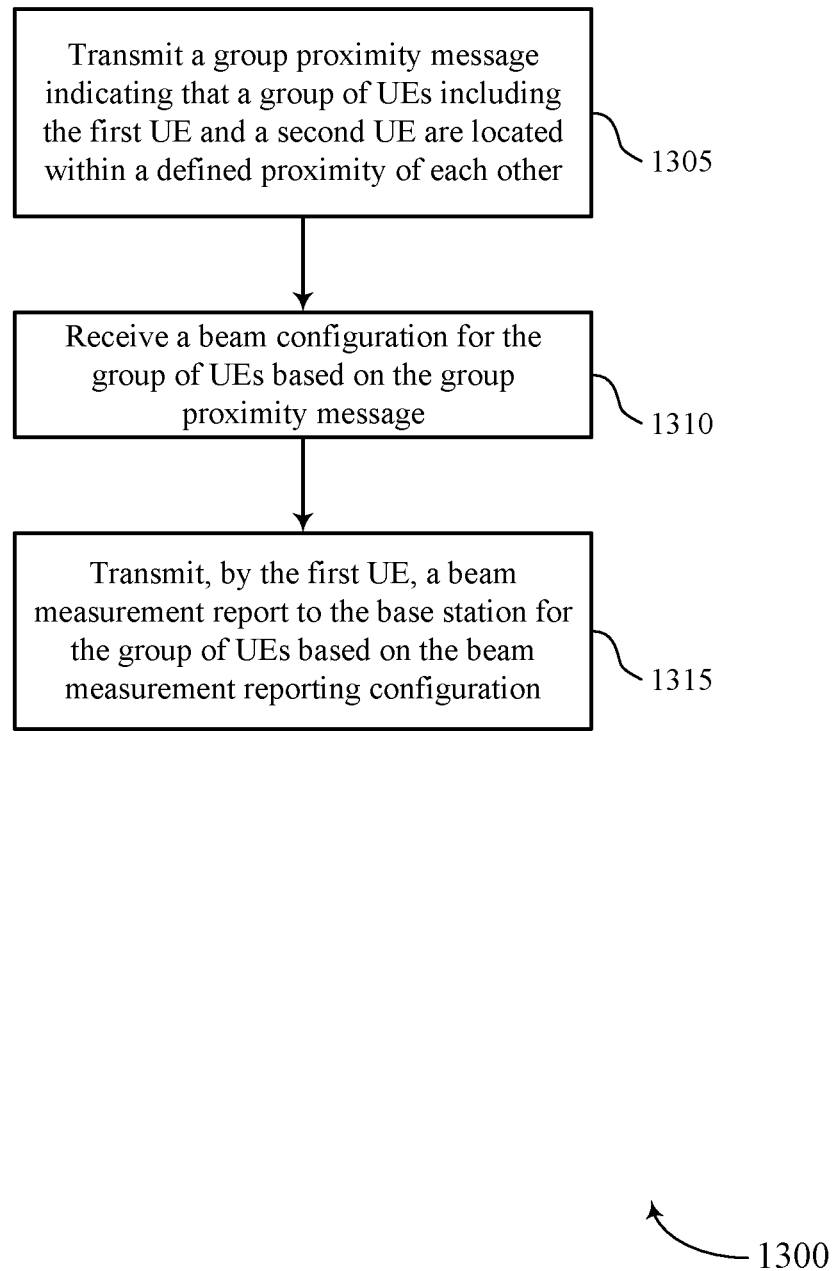

FIG. 13 shows a flowchart illustrating a method 1300 in accordance with aspects of the present disclosure. The operations of method 1300 may be implemented by a UE 115 or its components as described herein. For example, the operations of method 1300 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1305, the UE may transmit a group proximity message indicating that a group of UEs including the first UE and a second UE are located within a defined proximity of each other. The operations of 1305 may be performed according to the methods described herein. In some examples, aspects of the operations of 1305 may be performed by a group proximity message transmitting component as described with reference to FIGS. 4 through 7.

At 1310, the UE may receive a beam configuration for the group of UEs based on the group proximity message. The operations of 1310 may be performed according to the methods described herein. In some examples, aspects of the operations of 1310 may be performed by a beam configuration component as described with reference to FIGS. 4 through 7.

At 1315, the UE may transmit, by the first UE, a beam measurement report to the base station for the group of UEs based on the beam measurement reporting configuration. The operations of 1315 may be performed according to the methods described herein. In some examples, aspects of the operations of 1315 may be performed by a beam measurement reporting component as described with reference to FIGS. 4 through 7.

Figure 14:
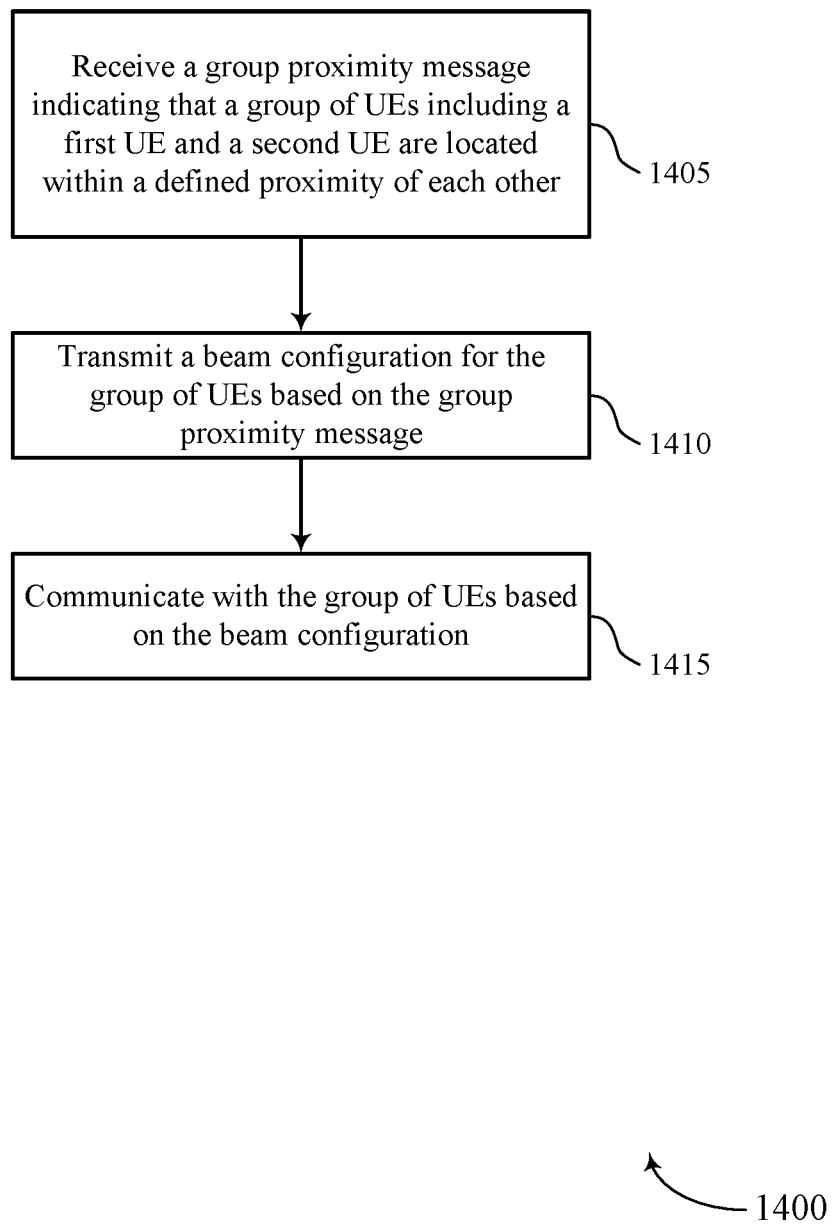

FIG. 14 shows a flowchart illustrating a method 1400 in accordance with aspects of the present disclosure. The operations of method 1400 may be implemented by a base station 105 or its components as described herein. For example, the operations of method 1400 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1405, the base station may receive a group proximity message indicating that a group of UEs including a first UE and a second UE are located within a defined proximity of each other. The operations of 1405 may be performed according to the methods described herein. In some examples, aspects of the operations of 1405 may be performed by a group proximity message receiving component as described with reference to FIGS. 8 through 11.

At 1410, the base station may transmit a beam configuration for the group of UEs based on the group proximity message. The operations of 1410 may be performed according to the methods described herein. In some examples, aspects of the operations of 1410 may be performed by a beam configuration transmitting component as described with reference to FIGS. 8 through 11.

At 1415, the base station may communicate with the group of UEs based on the beam configuration. The operations of 1415 may be performed according to the methods described herein. In some examples, aspects of the operations of 1415 may be performed by a beamformed communication component as described with reference to FIGS. 8 through 11.

Figure 15:
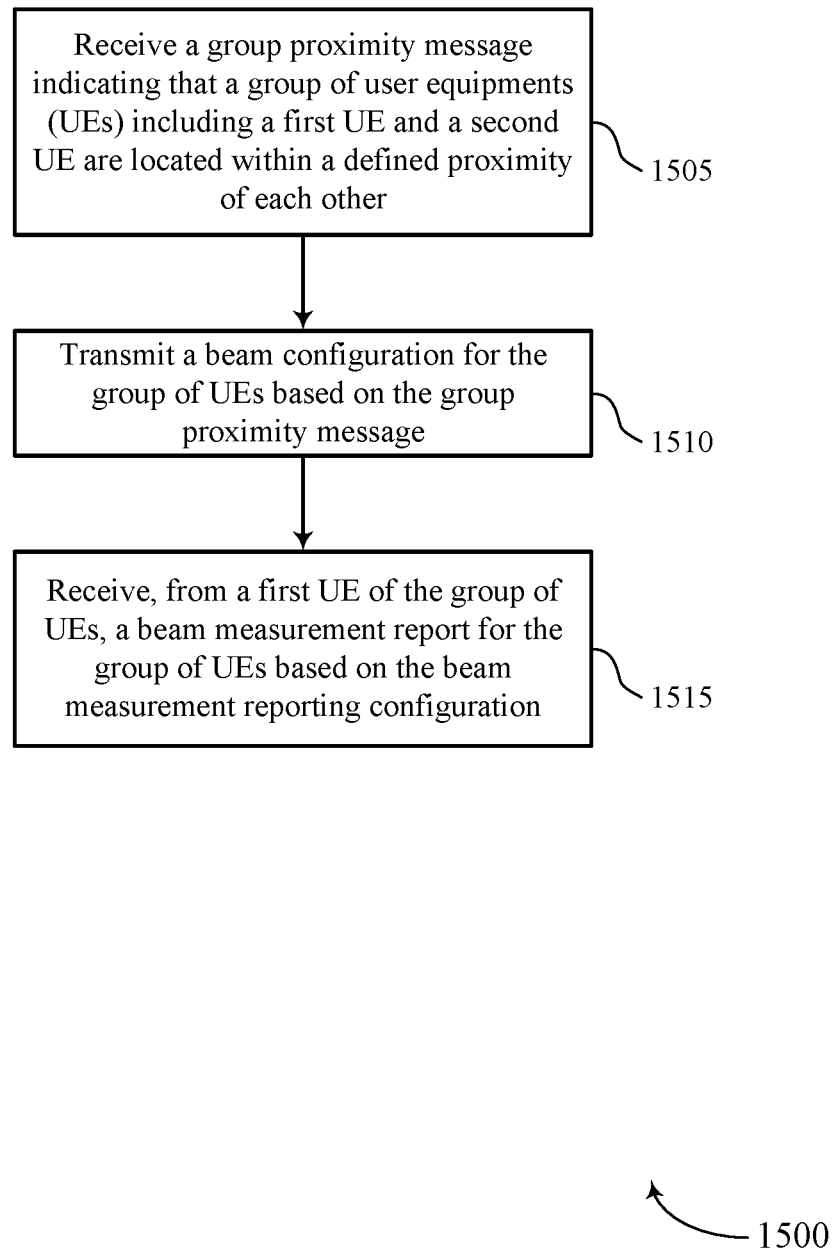

FIG. 15 shows a flowchart illustrating a method 1500 in accordance with aspects of the present disclosure. The operations of method 1500 may be implemented by a base station 105 or its components as described herein. For example, the operations of method 1500 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1505, the base station may receive a group proximity message indicating that a group of UEs including a first UE and a second UE are located within a defined proximity of each other. The operations of 1505 may be performed according to the methods described herein. In some examples, aspects of the operations of 1505 may be performed by a group proximity message receiving component as described with reference to FIGS. 8 through 11.

At 1510, the base station may transmit a beam configuration for the group of UEs based on the group proximity message. The operations of 1510 may be performed according to the methods described herein. In some examples, aspects of the operations of 1510 may be performed by a beam configuration transmitting component as described with reference to FIGS. 8 through 11.

At 1515, the base station may receive, from a first UE of the group of UEs, a beam measurement report for the group of UEs based on the beam measurement reporting configuration. The operations of 1515 may be performed according to the methods described herein. In some examples, aspects of the operations of 1515 may be performed by a beam measurement report configuration component as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications by a first user equipment (UE), comprising:
    communicating with a second UE to determine a spatial proximity between the first UE and the second UE;
    transmitting a group proximity message indicating that a group of UEs including the first UE and the second UE are located within a defined proximity of each other based at least in part on the determined spatial proximity;
    receiving a beam configuration for the group of UEs based at least in part on the group proximity message; and
    communicating with a base station based at least in part on the beam configuration.

2. The method of claim 1, wherein receiving the beam configuration comprises:
    receiving, by the first UE, a reference signal in accordance with a beam measurement reporting configuration for the group of UEs.

3. The method of claim 2, wherein communicating with the base station comprises:
    transmitting, by the first UE, a beam measurement report to the base station for the group of UEs based at least in part on the beam measurement reporting configuration.

4. The method of claim 3, further comprising:
    monitoring for a data transmission or a control transmission from the base station via a beam selected for transmissions to the group of UEs based at least in part on the beam measurement report.

5. The method of claim 1, wherein receiving the beam configuration comprises:
    receiving the beam configuration that indicates a beam measurement reporting configuration for a first subset of the group of UEs, the first subset including the first UE.

6. The method of claim 5, wherein communicating with the base station comprises:
    transmitting, by the first UE, a beam measurement report to the base station for the first subset based at least in part on the beam measurement reporting configuration.

7. The method of claim 6, further comprising:
    monitoring for a data transmission or a control transmission from the base station via a beam selected for transmissions to the first subset based at least in part on the beam measurement report.

8. The method of claim 7, wherein the first UE and the second UE are at respective edges of a formation of the group of UEs, and wherein a beam is selected by the base station for each UE in the group of UEs based at least in part on relative positions of respective UEs in the group.

9. The method of claim 1, wherein receiving the beam configuration further comprises:
receiving a broadcast message or a multicast message for the group of UEs indicating a beam selected by the base station for each UE in the group of UEs, wherein the communicating with the base station is based at least in part on the broadcast message or the multicast message.

10. The method of claim 9, wherein the broadcast message or the multicast message comprises downlink control information (DCI) or a medium access control (MAC) control element (MAC-CE).

11. The method of claim 10, wherein the DCI comprises a group common DCI.

12. The method of claim 11, wherein the group common DCI is scrambled using a radio network temporary identifier (RNTI) associated with the group of UEs.

13. The method of claim 1, wherein transmitting the group proximity message comprises:
transmitting a group identifier for the group of UEs.

14. The method of claim 1, wherein transmitting the group proximity message comprises:
transmitting group information for the group of UEs.

15. The method of claim 14, wherein the group information comprises one or more of a UE identifier for one or more UEs within the group of UEs, proximity metric data, group radius data, a leader identifier, UE position data, or any combination thereof.

16. The method of claim 1, wherein receiving the beam configuration comprises:
receiving the beam configuration that indicates a beam sweep pattern for the group of UEs, wherein communicating with the base station is in accordance with the beam sweep pattern.

17. A method for wireless communications by a base station, comprising:
receiving a group proximity message indicating that a group of user equipments (UEs) including a first UE and a second UE are located within a defined proximity of each other;
transmitting a beam configuration for the group of UEs based at least in part on the group proximity message; and
communicating with the group of UEs based at least in part on the beam configuration.

18. The method of claim 17, wherein transmitting the beam configuration comprises:
transmitting a reference signal in accordance with a beam measurement reporting configuration for the group of UEs.

19. The method of claim 18, wherein communicating with the group of UEs comprises:
receiving, from the first UE of the group of UEs, a beam measurement report for the group of UEs based at least in part on the beam measurement reporting configuration.

20. The method of claim 19, further comprising:
transmitting a data transmission or a control transmission to one or more UEs of the group of UEs via a beam selected for transmissions to the group of UEs based at least in part on the beam measurement report.

21. The method of claim 17, wherein transmitting the beam configuration comprises:
transmitting the beam configuration that indicates a first beam measurement reporting configuration for a first subset of the group of UEs and a second beam measurement reporting configuration for a second subset of the group of UEs.

22. The method of claim 21, wherein the first UE and the second UE are at respective edges of a formation of the group of UEs, the method further comprising:
selecting a beam for each UE in the group based at least in part on relative positions of respective UEs in the group of UEs.

23. The method of claim 21, wherein communicating with the group of UEs comprises:
receiving, from the first UE of the group of UEs, a first beam measurement report for the first subset based at least in part on the first beam measurement reporting configuration; and
receiving, from the second UE of the group of UEs, a second beam measurement report for the second subset based at least in part on the second beam measurement reporting configuration.

24. The method of claim 23, further comprising:
transmitting a first data transmission or a first control transmission from the base station to the first subset via a first beam selected for transmissions to the first subset based at least in part on the first beam measurement report; and
transmitting a second data transmission or a second control transmission from the base station to the second subset via a second beam selected for transmissions to the second subset based at least in part on the second beam measurement report.

25. The method of claim 17, wherein receiving the group proximity message comprises:
receiving the group proximity message that indicates movement sequence information for one or more UEs in the group of UEs.

26. The method of claim 17, wherein receiving the group proximity message comprises:
receiving a group identifier for the group of UEs.

27. The method of claim 26, wherein receiving the group proximity message comprises:
receiving a set of UE identifiers associated with the group identifier, wherein the set of UE identifiers correspond to the first UE and the second UE.

28. The method of claim 17, wherein receiving the group proximity message comprises:
receiving group information for the group of UEs.

29. The method of claim 28, wherein the group information comprises one or more of a UE identifier for one or more UEs within the group of UEs, proximity metric data, group radius data, a leader identifier, UE position data, or any combination thereof.

30. The method of claim 28, wherein the group proximity message indicates that the group of UEs including the first UE and the second UE are located within the defined proximity of each other based at least in part on UE position data for one or more UEs within the group of UEs.

31. The method of claim 17, wherein transmitting the beam configuration comprises:
transmitting the beam configuration that indicates a beam sweep pattern for the group of UEs, wherein communicating with the group of UEs is in accordance with the beam sweep pattern.

32. The method of claim 17, wherein transmitting the beam configuration further comprises:

transmitting a broadcast message or a multicast message for the group of UEs indicating a beam selected by the base station for each UE in the group of UEs, wherein the communicating with the group of UEs is based at least in part on the broadcast message or the multicast message.

33. The method of claim 32, wherein the broadcast message or the multicast message comprises downlink control information (DCI) or a medium access control (MAC) control element (MAC-CE).

34. The method of claim 33, wherein the DCI comprises a group common DCI.

35. The method of claim 34, further comprising scrambling the group common DCI using a radio network temporary identifier (RNTI) associated with the group of UEs.

36. An apparatus for wireless communications by a first user equipment (UE), comprising:
   a processor,
   memory coupled with the processor; and
   instructions stored in the memory and executable by the processor to cause the apparatus to:
      communicate with a second UE to determine a spatial proximity between the first UE and the second UE;
      transmit a group proximity message indicating that a group of UEs including the first UE and a second UE are located within a defined proximity of each other based at least in part on the determined spatial proximity;
      receive a beam configuration for the group of UEs based at least in part on the group proximity message; and
      communicate with a base station based at least in part on the beam configuration.

37. The apparatus of claim 36, further comprising a receiver, wherein the instructions to receive the beam configuration are executable by the processor to cause the apparatus to:
   receive, via the receiver, a reference signal in accordance with a beam measurement reporting configuration for the group of UEs.

38. The apparatus of claim 37, wherein the instructions to communicate with the base station are executable by the processor to cause the apparatus to:
   transmit, by the first UE, a beam measurement report to the base station for the group of UEs based at least in part on the beam measurement reporting configuration.

39. The apparatus of claim 38, wherein the instructions are further executable by the processor to cause the apparatus to:
   monitor for a data transmission or a control transmission from the base station via a beam selected for transmissions to the group of UEs based at least in part on the beam measurement report.

40. The apparatus of claim 36, wherein the instructions to receive the beam configuration are executable by the processor to cause the apparatus to:
   receive the beam configuration that indicates a beam measurement reporting configuration for a first subset of the group of UEs, the first subset including the first UE.

41. The apparatus of claim 40, wherein the instructions to communicate with the base station are executable by the processor to cause the apparatus to:
   transmit, by the first UE, a beam measurement report to the base station for the first subset based at least in part on the beam measurement reporting configuration.

42. The apparatus of claim 41, wherein the instructions are further executable by the processor to cause the apparatus to:
   monitor for a data transmission or a control transmission from the base station via a beam selected for transmissions to the first subset based at least in part on the beam measurement report.

43. The apparatus of claim 42, wherein the first UE and the second UE are at respective edges of a formation of the group of UEs, and wherein a beam is selected by the base station for each UE in the group based at least in part on relative positions of respective UEs in the group of UEs.

44. The apparatus of claim 36, wherein the instructions to receive the beam configuration are executable by the processor to cause the apparatus to:
   receive a broadcast message or a multicast message for the group of UEs indicating a beam selected by the base station for each UE in the group of UEs, wherein the instructions to communicate with the base station are further executable by the processor to cause the apparatus to communicate with the base station based at least in part on the broadcast message or the multicast message.

45. The apparatus of claim 44, wherein the broadcast message or the multicast message comprises downlink control information (DCI) or a medium access control (MAC) control element (MAC-CE).

46. The apparatus of claim 45, wherein the DCI comprises a group common DCI.

47. The apparatus of claim 46, wherein the group common DCI is scrambled using a radio network temporary identifier (RNTI) associated with the group of UEs.

48. The apparatus of claim 36, wherein the instructions to transmit the group proximity message are executable by the processor to cause the apparatus to:
   transmit a group identifier for the group of UEs.

49. The apparatus of claim 36, wherein the instructions to transmit the group proximity message are executable by the processor to cause the apparatus to:
   transmit group information for the group of UEs.

50. The apparatus of claim 49, wherein the group information comprises one or more of a UE identifier for one or more UEs within the group of UEs, proximity metric data, group radius data, a leader identifier, UE position data, or any combination thereof.

51. The apparatus of claim 36, wherein the instructions to receive the beam configuration are executable by the processor to cause the apparatus to:
   receive the beam configuration that indicates a beam sweep pattern for the group of UEs, wherein communicating with the base station is in accordance with the beam sweep pattern.

52. An apparatus for wireless communications by a base station, comprising:
   a processor,
   memory coupled with the processor; and
   instructions stored in the memory and executable by the processor to cause the apparatus to:
      receive a group proximity message indicating that a group of user equipments (UEs) including a first UE and a second UE are located within a defined proximity of each other;
      transmit a beam configuration for the group of UEs based at least in part on the group proximity message; and
      communicate with the group of UEs based at least in part on the beam configuration.

53. The apparatus of claim 52, further comprising a transmitter, wherein the instructions to transmit the beam configuration are executable by the processor to cause the apparatus to:
  transmit, via the transmitter, a reference signal in accordance with a beam measurement reporting configuration for the group of UEs.

54. The apparatus of claim 53, wherein the instructions to communicate with the group of UEs are executable by the processor to cause the apparatus to:
  receive, from the first UE of the group of UEs, a beam measurement report for the group of UEs based at least in part on the beam measurement reporting configuration.

55. The apparatus of claim 54, wherein the instructions are further executable by the processor to cause the apparatus to:
  transmit a data transmission or a control transmission to one or more UEs of the group of UEs via a beam selected for transmissions to the group of UEs based at least in part on the beam measurement report.

56. The apparatus of claim 52, wherein the instructions to transmit the beam configuration are executable by the processor to cause the apparatus to:
  transmit the beam configuration that indicates a first beam measurement reporting configuration for a first subset of the group of UEs and a second beam measurement reporting configuration for a second subset of the group of UEs.

57. The apparatus of claim 56, wherein the first UE and the second UE are at respective edges of a formation of the group of UEs, and wherein the instructions are further executable by the processor to cause the apparatus to
  select a beam for each UE in the group of UEs based at least in part on relative positions of respective UEs in the group.

58. The apparatus of claim 56, wherein the instructions to communicate with the group of UEs are executable by the processor to cause the apparatus to:
  receive, from the first UE of the group of UEs, a first beam measurement report for the first subset based at least in part on the first beam measurement reporting configuration; and
  receive, from the second UE of the group of UEs, a second beam measurement report for the second subset based at least in part on the second beam measurement reporting configuration.

59. The apparatus of claim 58, wherein the instructions are further executable by the processor to cause the apparatus to:
  transmit a first data transmission or a first control transmission from the base station to the first subset via a first beam selected for transmissions to the first subset based at least in part on the first beam measurement report; and
  transmit a second data transmission or a second control transmission from the base station to the second subset via a second beam selected for transmissions to the second subset based at least in part on the second beam measurement report.

60. The apparatus of claim 52, wherein the instructions to receive the group proximity message are executable by the processor to cause the apparatus to:
  receive the group proximity message that indicates movement sequence information for one or more UEs in the group of UEs.

61. The apparatus of claim 52, wherein the instructions to receive the group proximity message are executable by the processor to cause the apparatus to:
  receive a group identifier for the group of UEs.

62. The apparatus of claim 61, wherein the instructions to receive the group proximity message are executable by the processor to cause the apparatus to:
  receive a set of UE identifiers associated with the group identifier, wherein the set of UE identifiers correspond to the first UE and the second UE.

63. The apparatus of claim 52, wherein the instructions to receive the group proximity message are executable by the processor to cause the apparatus to:
  receive group information for the group of UEs.

64. The apparatus of claim 63, wherein the group information comprises one or more of a UE identifier for one or more UEs within the group of UEs, proximity metric data, group radius data, a leader identifier, UE position data, or any combination thereof.

65. The apparatus of claim 63, wherein the group proximity message indicates that the group of UEs including the first UE and the second UE are located within the defined proximity of each other based at least in part on UE position data for one or more UEs within the group of UEs.

66. The apparatus of claim 52, wherein the instructions to transmit the beam configuration are executable by the processor to cause the apparatus to:
  transmit the beam configuration that indicates a beam sweep pattern for the group of UEs, wherein communicating with the group of UEs is in accordance with the beam sweep pattern.

67. The apparatus of claim 52, wherein the instructions to transmit the beam configuration are executable by the processor to cause the apparatus to:
  transmit a broadcast message or a multicast message for the group of UEs indicating a beam selected by the base station for each UE in the group of UEs, wherein the communicating with the group of UEs is based at least in part on the broadcast message or the multicast message.

68. The apparatus of claim 67, wherein the broadcast message or the multicast message comprises downlink control information (DCI) or a medium access control (MAC) control element (MAC-CE).

69. The apparatus of claim 68, wherein the DCI comprises a group common DCI.

70. The apparatus of claim 69, wherein the instructions are further executable by the processor to cause the apparatus to:
  scramble the group common DCI using a radio network temporary identifier (RNTI) associated with the group of UEs.

71. An apparatus for wireless communications by a first user equipment (UE), comprising:
  means for communicating with a second UE to determine a spatial proximity between the first UE and the second UE;
  means for transmitting a group proximity message indicating that a group of UEs including the first UE and a second UE are located within a defined proximity of each other based at least in part on the determined spatial proximity;
  means for receiving a beam configuration for the group of UEs based at least in part on the group proximity message; and
  means for communicating with a base station based at least in part on the beam configuration.

72. An apparatus for wireless communications by a base station, comprising:
- means for receiving a group proximity message indicating that a group of user equipments (UEs) including a first UE and a second UE are located within a defined proximity of each other;
- means for transmitting a beam configuration for the group of UEs based at least in part on the group proximity message; and
- means for communicating with the group of UEs based at least in part on the beam configuration.

73. The apparatus of claim 72, wherein the means for transmitting the beam configuration comprises:
- means for transmitting the beam configuration that indicates a beam sweep pattern for the group of UEs, wherein communicating with the group of UEs is in accordance with the beam sweep pattern.

74. A non-transitory computer-readable medium storing code for wireless communications by a first user equipment (UE), the code comprising instructions executable by a processor to:
- communicate with a second UE to determine a spatial proximity between the first UE and the second UE;
- transmit a group proximity message indicating that a group of UEs including the first UE and a second UE are located within a defined proximity of each other based at least in part on the determined spatial proximity;
- receive a beam configuration for the group of UEs based at least in part on the group proximity message; and
- communicate with a base station based at least in part on the beam configuration.

75. A non-transitory computer-readable medium storing code for wireless communications by a base station, the code comprising instructions executable by a processor to:
- receive a group proximity message indicating that a group of user equipments (UEs) including a first UE and a second UE are located within a defined proximity of each other;
- transmit a beam configuration for the group of UEs based at least in part on the group proximity message; and
- communicate with the group of UEs based at least in part on the beam configuration.

* * * * *